United States Patent
Rizvi et al.

(10) Patent No.: US 10,524,497 B2
(45) Date of Patent: Jan. 7, 2020

(54) EXTRUSION OF AGRO-FOOD INDUSTRY BYPRODUCTS AND PROTEIN CONCENTRATES INTO VALUE-ADDED FOODS

(71) Applicant: CORNELL UNIVERSITY, Ithaca, NY (US)

(72) Inventors: Syed S. H. Rizvi, Ithaca, NY (US); Ilankovan Paraman, Chesterfield, MO (US)

(73) Assignee: CORNELL UNIVERSITY, Ithaca, NY (US)

( * ) Notice: Subject to any disclaimer, the term of this patent is extended or adjusted under 35 U.S.C. 154(b) by 854 days.

(21) Appl. No.: 14/657,560

(22) Filed: Mar. 13, 2015

(65) Prior Publication Data
US 2015/0282507 A1 Oct. 8, 2015

Related U.S. Application Data

(60) Provisional application No. 61/952,615, filed on Mar. 13, 2014.

(51) Int. Cl.
A23P 30/20 (2016.01)
(52) U.S. Cl.
CPC .................. *A23P 30/20* (2016.08)
(58) Field of Classification Search
CPC .......... A23L 19/07; A23L 19/09; A23L 19/01; A23P 30/34; A23P 30/20
See application file for complete search history.

(56) References Cited

U.S. PATENT DOCUMENTS

| | | |
|---|---|---|
| 5,417,992 A | 5/1995 | Rizvi et al. |
| 7,220,442 B2 | 5/2007 | Gautam |
| 8,877,277 B2 | 11/2014 | Ganjyal |

(Continued)

FOREIGN PATENT DOCUMENTS

WO 2015016830 A1 2/2015

OTHER PUBLICATIONS

Altan, A., McCarthy, K. L., & Maskan, M. (2008a). Evaluation of snack foods from barley—tomato pomace blends by extrusion processing. Journal of Food Engineering, 84(2), 231-242.
(Continued)

*Primary Examiner* — Jenna A Watts
(74) *Attorney, Agent, or Firm* — FisherBroyles, LLP; Andrew K. Gonsalves, Esq.

(57) ABSTRACT

The present invention relates to a process for preparing an edible foodstuff from food industry waste stream byproducts. This process involves the steps of: (i) combining, in an extruder, an extrusion formulation comprising a first food byproduct and at least one additional ingredient; (ii) introducing supercritical carbon dioxide (SC-CO$_2$) into the extruder to mix with the first food byproduct and the at least one additional ingredient; and (iii) producing an edible foodstuff containing the first food byproduct and the at least one additional ingredient, where the edible foodstuff comprises an extrudate prepared under supercritical fluid extrusion (SCFX) conditions. The present invention also relates to a process for preparing an edible foodstuff from a protein concentrate. The present invention further relates to edible foodstuffs produced by the various processes disclosed herein.

13 Claims, 12 Drawing Sheets

(56) References Cited

U.S. PATENT DOCUMENTS

| | | | | |
|---|---|---|---|---|
| 2005/0084579 | A1* | 4/2005 | Onwulata | A23J 3/265 |
| | | | | 426/516 |
| 2009/0214735 | A1 | 8/2009 | Wu | |
| 2011/0014328 | A1 | 1/2011 | Rizvi | |
| 2013/0136830 | A1* | 5/2013 | Ganjyal | A23B 7/02 |
| | | | | 426/250 |
| 2013/0287922 | A1 | 10/2013 | Ganjyal | |

OTHER PUBLICATIONS

Karkle, E. L., Alavi, S., & Dogan, H. (2012). Cellular architecture and its relationship with mechanical properties in expanded extrudates containing apple pomace. Food research international, 46(1), 10-21.

Khanal, RC, Howard LR, Brownmiller C, Prior RL (2009a) Influence of extrusion processing on procyanidin composition and total anthocyanin contents of blueberry pomace. Journal of Food Science 74:52-58.

Kumar, N., Sarkar, B.C., and Sharma, H.K. (2010). Development and Characterization of Extruded Product of Carrot Pomace, Rice Flour and Pulse Powder. African J. Food Science 4(11):703-717.

Sanal et al. (2004). Recycling of Apricot Pomace by Supercritical $CO_2$ Extraction. J. Supercritical Fluids 32 (1-3):221-230.

Brennan, M. A., Derbyshire, E., Tiwari, B. K., & Brennan, C. S. (2013). Ready-to-eat snack products: the role of extrusion technology in developing consumer acceptable and nutritious snacks. International Journal of Food Science & Technology 48:893-902.

Bhushan, S., Kalia, K., Sharma, M., Singh, B., & Ahuja, P.S. (2008). Processing of apple pomace for bioactive molecules. Critical reviews in biotechnology, 28(4), 285-96.

Balasundram, N., Sundram, K., & Samman, S. (2006). Phenolic compounds in plants and agri-industrial by-products: Antioxidant activity, occurrence, and potential uses. Food Chemistry, 99(1), 191-203.

Yu, J., & Ahmedna, M. (2013). Functional components of grape pomace: Their composition, biological properties and potential applications. International Journal of Food Science and Technology, 48(2), 221-237.

Gassara, Fatma, Brar, S.K., Pelletier, F., Verma, M., Godbout, S., & Tyagi, R.D. (2011). Pomace waste management scenarios in Québec—Impact on greenhouse gas emissions. Journal of Hazardous Materials, 192(3), 1178-1185.

Min, S., Evrendilek, G.A., & Zhang, H.Q. (2007). Pulsed electric fields: processing system, microbial and enzyme inhibition, and shelf life extension of foods. IEEE Transactions on Plasma Science, 35(1), 59-73.

Hwang, J.K, Choi, J.S., Kim, C.J., & Kim, C.T. (1998). Solubilization of Apple Pomace by Extrusion. Journal of Food Processing and Preservation, 22(6), 477-491.

Walsh, M.K., & Wood, A.M. (2010). Properties of Extrusion-Expanded Whey Protein Products Containing Fiber. International Journal of Food Properties, 13 (4), 702-712.

Harper, J.M. (1981). Extrusion of Foods, vol. 1. pp. 21-45. Boca Raton: CRC press, Inc.

Onwulata, C.I., & Heymann, H. (1994). Sensory properties of extruded corn meal related to the spatial distribution of process conditions. Journal of sensory studies, 9(1), 101-112.

Alavi, S., & Rizvi, S.S.H. (2009). Supercritical fluid extrusion—a novel method for producing microcellular structures in starch-based matrices. In J. Ahmed, H. S. Ramaswamy, S. Kasapis, & J. Boye (Eds.), Novel food processing—effects on rheological and functional properties (pp. 403-420). Baca Raton, FL: CRC Press.

Mahawar, M., Singh, A., & Jalgaonkar, K. (2012). Utility of apple pomace as a substrate for various products: A review. Food and Bioproducts Processing, 90 (4), 597-605.

Schieber, Andreas, et al., "A new process for the combined recovery of pectin and phenolic compounds from apple pomace." Innovative Food Science & Emerging Technologies 4.1 (2003): 99-107.

Madrera, R. R., Bedriñana, R. P., Hevia, A. G., Arce, M. B., & Valles, B. S. (2013). Production of spirits from dry apple pomace and selected yeasts. Food and Bioproducts Processing 91:623-631.

Robinson, T. Chandran, B. Nigam, P. Removal of dyes from a synthetic textile dye effluent by biosorption on apple pomace and wheat straw. Water Research, 36 (2002), pp. 2824-2830.

Vendruscolo, F., Albuquerque, P. M., Streit, F., Esposito, E., & Ninow, J. L. (2008). Apple pomace: A versatile substrate for biotechnological applications. Critical Reviews in Biotechnology, 28(1):1-12.

Wang, H.J. Thomas R.L. (1989). Direct Use of Apple Pomace in Bakery Products. Journal of Food Science, 54 (3):618-620.

Masoodi, F. A., Sharma, B., & Chauhan, G. S. (2002). Use of apple pomace as a source of dietary fiber in cakes. Plant Foods for Human Nutrition, 57(2):121-128.

Alavi, S., Karkle, E., Adhikari, K., & Keller, L. (2011). Extrusion research for addressing the obesity challenge. Cereal foods world, 56(2):56-60.

Khanal, R.C., Howard, L.R., & Prior, R.L. (2009b). Procyanidin Content of Grape Seed and Pomace, and Total Anthocyanin Content of Grape Pomace as Affected by Extrusion Processing. Journal of Food Science, 74(6), H174-H182.

White, BL, Howard LR, Prior RL (2010) Release of bound procyanidins from cranberry pomace by alkaline hydrolysis. Journal of Agricultural and Food Chemistry, 58:7572-7579.

* cited by examiner

EXTRUSION OF AGRO-FOOD INDUSTRY BYPRODUCTS AND PROTEIN CONCENTRATES INTO VALUE-ADDED FOODS

CROSS-REFERENCE TO RELATED APPLICATIONS

This application claims priority benefit of U.S. Provisional Patent Application Ser. No. 61/952,615, filed Mar. 13, 2014, the disclosure of which is hereby incorporated by reference herein in its entirety.

FIELD OF THE INVENTION

The present invention relates to processes for producing edible foodstuffs from food industry byproducts and protein concentrates using supercritical fluid extrusion (SCFX), as well as the edible foodstuffs produced by these processes.

BACKGROUND OF THE INVENTION

As the agro-food industries grow worldwide, increasingly large quantities of fruit-processing byproducts are generated as waste accounting for 25-40% of the total fruits processed (Bhushan et al. 2008). These fruit residues, referred to as 'pomace', are the pulpy solid remaining after the extraction of juice from fruits, which comprised of peel, seeds, and pulp of the fruit and contain significant quantity of dietary fiber, natural antioxidants, phytochemicals (Balasundram et al., 2006; Yu and Ahmedna, 2013). For instance, around 30-40% apple pomace and 5-11% sludge of the original fruit is generated as a byproduct in a typical cider-processing operation (Gassara et al. 2011). Similarly, grape pomace is a by-product of wine industry accounting for about 20-25% of the weight of the grape crushed for wine production (Yu and Ahmedna 2013). While apple pomace has been used to make citrate, most pomace is viewed as an industrial waste with very little or no economic value and used either as animal feed or returned to farms for composting.

Similarly, the recent phenomenal growth in Greek style yogurt (GSY) has also created a new problem. For every pound of Greek style yogurt, 2-3 pounds of whey is generated as byproduct. Although yogurt whey contains nutritional qualities, it contains fewer solids than conventional cheese whey, which makes it less valuable. The disposal of yogurt whey has become a challenge for the industry. So far, no viable solution has emerged on how to dispose of millions of pounds of GSY whey that is produced every day. Furthermore, whey, especially acid whey, generated during cheese manufacturing also poses disposal problems and its direct use in value-added products of commercial utility would indeed be highly desirable. However, until the present invention, such processes and resulting products have not been developed.

Various fruits and vegetable pomace, including apple and grape pomace, are utilized in extrusion applications (Karkle et al. 2012; Altan et al. 2008b; Khanal et al. 2009b). Extrusion technology is a process of choice to produce a variety of convenience foods due to its versatility, high productivity, low cost, and energy efficiency, and is widely used to enhance the overall digestibility and bioavailability of nutrients (Harper 1981; Brennan et al. 2013). Extrusion is a continuous process that involves high temperature, short time (HTST) cooking, which can decrease spoilage microorganisms and inactivate enzymes. During the process proteins are denatured, starches are gelatinized, and extrudates are texturally restructured (Min et al. 2007). Because extrusion provides a continuous process with mechanical shear to degrade plant cell wall, the insoluble intermolecular network of fruit pomace is disintegrated and the soluble dietary fiber content is improved (Hwang 1998). However, pomace addition decreases the textural qualities of extruded products (Walsh, 2010) and the high-temperature (130-180° C.), high-shear processing conditions used in conventional steam extrusion can also destroy heat sensitive bioactives and nutrients (Onwulata & Heymann, 1994; Alavi & Rizvi, 2009).

Recently, high-temperature steam-extrusion processing has been tried as a means to incorporate fruit and vegetable byproducts in food. However, the high temperatures used led to a loss of nutritional and sensory qualities.

As a part of fruit, the pomace has the potential to be transformed into various ingredients for food applications. For instance, apple pomace, which consists of peel, core and pulp, can be converted into various food and industrial ingredients such as citric acid (Mahawar et al., 2012), pectin (Schieber, 2003); alcohols (Madrera, 2013), bio-adsorbents (Robinson et al., 2002) and biofuels (Vendruscolo et al., 2008). However, the economics of such undertakings is often found to be unattractive for commercialization of the developed processes. As a rich source of dietary fiber and phytochemicals, direct utilization of the pomace in food application can offer an attractive opportunity to both the processors and consumers. Previous attempts to use fruit pomace in various food applications over the past decades (Wang and Thomas 1989; Masoodi and Chauhan 1998; Alavi et al., 2011), to the best of our knowledge, have not materialized into commercial products due its negative impacts on end-product sensory qualities.

Extrusion processing as a means of incorporating fruit and vegetable byproducts in food application is relatively new. However, the effect of pomace addition on end-product sensory or nutritional qualities largely varied depending on extrusion conditions used in processing, pre and post-extrusion treatments, source of the byproduct, etc. However, the conventional cooking extrusion used in all the previous studies is based on high-temperature (130-200° C.) and high-shear (150-300 rpm) operations. Such extreme processing requirements lead to loss of sensory and nutritional qualities and lead to products of undesirable and variable qualities.

The color pigments and bioactive compounds are typically sensitive to high heat and shear used in conventional steam extrusion (Brennan et al., 2011). A wide range of bioactive compound loss (46-90%) has been reported depending on the severity of the conventional steam extrusion (Camire et al., 2007; Khanal et al., 2009a, White et al., 2010). For instance, only 35% of the total anthocyanin present in the cranberry pomace were retained at high barrel temperature (190° C.) and screw speed (200 rpm); the retention was increased to 54% when the barrel temperature was reduced to 150° C. (White et al., 2010), however, the study did not indicate the physical characteristics or textural qualities of the final extruded products. Camire et al., (2007) reported a 90% loss of anthocyanin for extrusion cooking of various fruit powders. The losses are mainly due to high temperature (170° C.) and shear (175 rpm) used in the extrusion. Generally, the phenolic acids are decarboxylated and condensed into tannins at high temperature processing (Brennan et al., 2011).

U.S. Pat. No. 8,877,277 to Ganjyal and the related U.S. Patent Application Publication No. US 2013/0287922 to Ganjyal (collectively the "Ganjyal disclosures") are directed to a method of making a food product by forming an expanded extrudate using a supercritical fluid extrusion process, as well as to the supercritical fluid extruded food product produced by the method, but restricted to formulations with starch having very specific viscosity requirements. The Ganjyal disclosures mention that fruit- and vegetable-based ingredients can be used in the method, and that proteins such as whey proteins can also be mixed into various ingredient formulations. However, the Ganjyal disclosures mention that post-extrusion processing (e.g., post-extrusion vacuum drying) was needed when using fruit pomace such as cranberry powder (pomace) in the extrusion process. Further, in every instance, the Ganjyal disclosures described the use of a separate hydration step (i.e., adding water) during the supercritical fluid extrusion process. There is no mention or suggestion to forego this hydration step, and no mention of using liquid whey byproduct or even milk protein concentrate (MPC) as ingredients in the supercritical fluid extrusion process.

U.S. Pat. No. 7,220,442 to Gautam et al. ("Gautam") is directed to a process for preparing a nutrition bar from non-soy proteins using supercritical fluid extrusion. Gautam teaches that the non-soy proteins can be from sources such as whey protein, particularly whey protein isolates and whey protein concentrates. The supercritical fluid extrusion process of Gautam also requires a separate water hydration step, including adding water to the whey protein isolates or the whey protein concentrates. Gautam does not describe or suggest the use of liquid whey byproduct as an ingredient in the supercritical fluid extrusion formulations, and certainly fails to teach or suggest that a liquid whey byproduct can be used in lieu of water as a source of hydration in the supercritical fluid extrusion process.

The present invention is directed to overcoming these and other deficiencies in the art.

SUMMARY OF THE INVENTION

The present disclosure generally relates to food extrusion processes for converting food industry byproducts, as well as protein concentrates, into edible food products, including, for example, shelf-stable, puffed products. The present disclosure also generally relates to the food products produced by the disclosed processes. In various embodiments, the processes of the present disclosure are effective in producing food products that are enriched in dietary fiber and phytochemicals by using low-shear, low-temperature supercritical fluid extrusion. As described herein, overall, the process of this invention could serve as a model system for today's food processing operations to better transform their byproduct streams into value-added, edible products.

In one aspect, the present disclosure provides a process for preparing an edible foodstuff from food industry waste stream byproducts. This process involves the steps of: (i) combining, in an extruder, an extrusion formulation comprising a first food byproduct and at least one additional ingredient; (ii) introducing supercritical carbon dioxide (SC-$CO_2$) into the extruder to mix with the first food byproduct and the at least one additional ingredient; and (iii) producing an edible foodstuff containing the first food byproduct and the at least one additional ingredient, where the edible foodstuff comprises an extrudate prepared under supercritical fluid extrusion (SCFX) conditions. In accordance with this process, the first food byproduct is a non-reconstituted liquid food byproduct, and the additional ingredient optionally comprises a second food byproduct. In one embodiment of this process, the extrusion formulation further comprises one or more of starch, flour, protein concentrate, functional additives, or flavoring ingredients.

In another aspect, the present disclosure provides a process for preparing an edible foodstuff from a protein concentrate. This process includes the steps of: (i) providing, in an extruder, an extrusion formulation comprising a protein concentrate in either liquid or powder form; and (ii) extruding the protein concentrate from the extruder in the form of an expanded extrudate using supercritical carbon dioxide (SC-$CO_2$) under supercritical fluid extrusion (SCFX) conditions, thereby yielding an edible foodstuff comprising the expanded extrudate of the protein concentrate.

In another aspect, the present disclosure provides edible foodstuffs produced by the various processes disclosed herein.

By way of an example, as noted herein, one aspect of the present disclosure is to provide a process to convert food industry waste streams (byproducts or co-products) into shelf-stable, nutrient-enriched extruded products by using a low-shear, low-temperature supercritical fluid extrusion (SCFX) process. In a particular embodiment, the process utilizes cheese/yogurt whey and fruit pomace to directly yield extruded, ready-to-eat products such as breakfast cereals, healthy snacks, protein puffs, and nutrition bars, among other food items. The pomace and whey fortified extruded products of the present disclosure have good textural qualities and are enriched in fruit-based dietary fiber and bioactive phytochemicals and milk nutrients. The natural color of the fruit pomace is preserved in the final products and the process retains greater than 70% of the total polyphenols and 60% of the total antioxidants present in the fruit pomace. The novel combination of SCFX and agro-industry waste streams offers a unique combination to effectively preserve and utilize the nutritionally attractive byproducts as a source of functional ingredients in extruded products, while adding value to the industrial waste streams.

One advantage that makes this process of the present disclosure unique is that liquid whey (which contains protein as well as other non-protein components) takes the place of water in the SCFX process, which at this time is a significant waste product of the 'Greek' yogurt industry. The use of liquid whey is beneficial since the dehydration and drying of whey, as used in most other products that use whey, leads to destruction of nutrients due to the drying process. The drying and dehydration process is also energy intensive.

BRIEF DESCRIPTION OF THE DRAWINGS

The patent or application file contains at least one drawing executed in color. Copies of this patent or patent application publication with color drawings will be provided by the U.S. Patent and Trademark Office upon request and payment of the necessary fee.

DETAILED DESCRIPTION OF THE INVENTION

Figure 1:
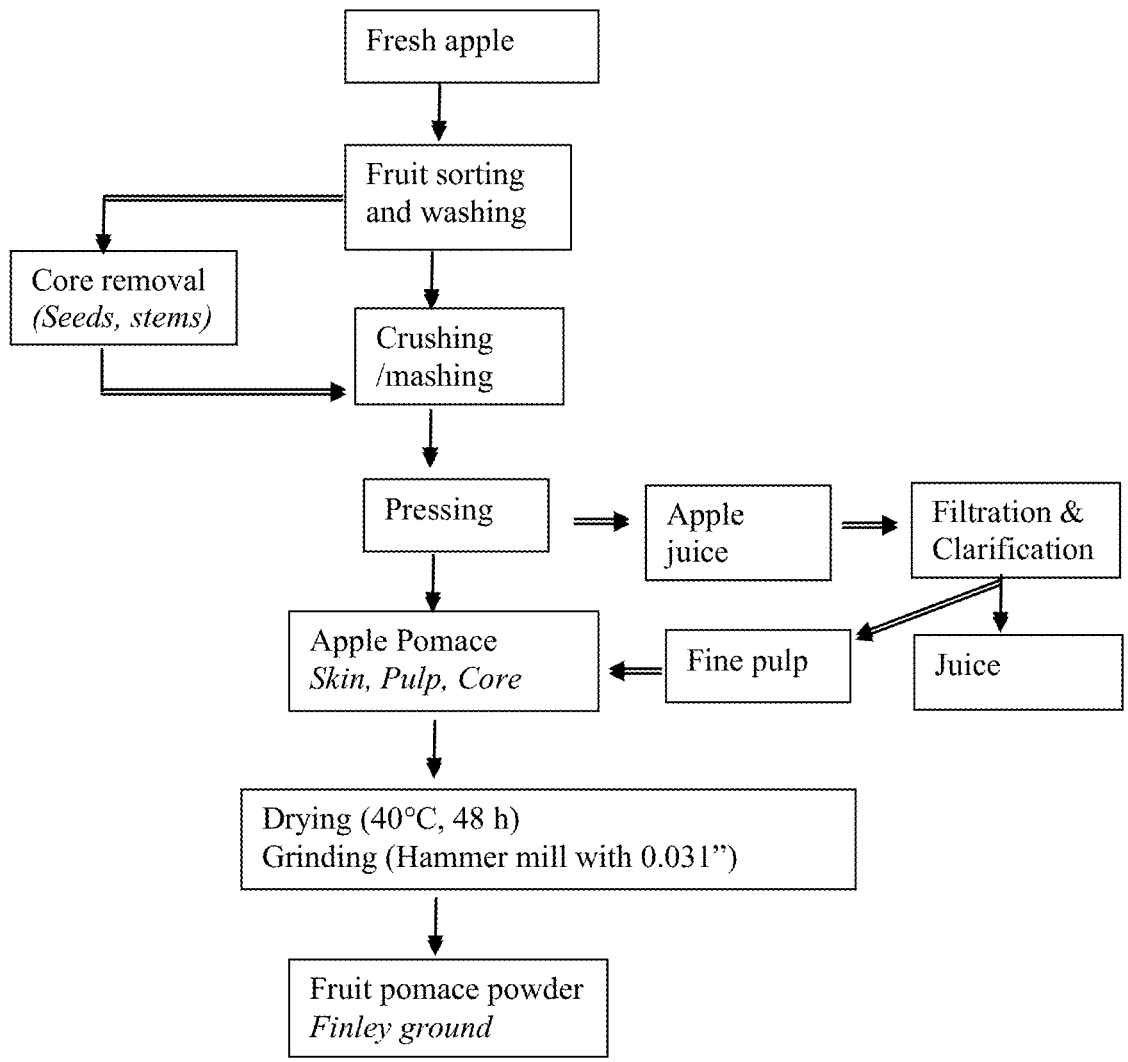
FIG. 1 is a flowchart for recovering food grade apple pomace from apple juice processing.

The present disclosure relates to, inter alia, processes for producing edible foodstuffs from food industry byproducts and protein concentrates using supercritical fluid extrusion (SCFX), as well as the edible foodstuffs produced by these processes.

As provided, the processes of the present disclsoure utilize the SCFX process, which is a modified process utilizing supercritical fluids such as supercritical carbon dioxide (SC-$CO_2$) as an expansion agent instead of steam. The process produces highly expanded, low-density products at process temperatures below 100° C. along with low shear conditions (Rizvi et al., 1992, Rizvi et al., 1995). Therefore, heat- or shear-sensitive nutrients and bioactives can be effectively incorporated to produce nutrient enriched products without much nutrient loss (Alavi & Rizvi, 2009, Cho & Rizvi, 2010, Paraman et al., 2012, Paraman et al., 2013). The mild operating requirements are particularly advantageous to process fruits, vegetables, and their byproducts (e.g., fruit and vegetable pomace) with enhanced nutritional and sensory qualities, along with whey as a replacement for water, which is required during extrusion processing. Thus, the present disclosure provides a process effective for, inter alia, recapturing economic benefits of fruit and vegetable pomace via efficient utilization and value addition.

As provided, the present disclosure relates to processes that yield expanded extrudates, particularly those based on fruit, vegetable, and dairy industry byproducts, by incorporating them directly into shelf-stable, puffed, extruded products. These processes yield expanded extrudates that have high nutritional profiles and sensory qualities, compared to products based on different process mechanisms. Unlike the processes of the present disclosure, no processes used or proposed for use to date in the food industry have been able to provide expanded extrudates from pomace and whey having such high nutritional qualities, texture and sensory properties. Nor have processes known to date been proposed to obtain such products at low temperature and with unique texture.

Compared to conventional high-temperature food extrusion processes, the present disclosure's use of SCFX processes involving supercritical $CO_2$ is processed at lower, sub-steam temperatures, allowing for the retention of phenolics and other phytochemicals in the end product.

Whey and pomace as used by the processes of the present disclosure can be used in formulations to yield a fortified product and have good textural qualities (due to the plasticizer property of liquid whey and SCFX process) and are enriched in dietary fiber, bioactive phytochemicals, milk protein and nutrients. The natural color of the fruit pomace is preserved in the final products and the end product as made by this process retains over 80% of the total polyphenols and over 70% of the total antioxidants present in the fruit pomace.

The novel combination of SCFX and agro-industry waste streams offers a unique combination to effectively preserve and utilize the nutritionally attractive byproducts as a source of functional ingredients in extruded products while adding value to the industrial waste streams.

Further aspects of the processes and edible foodstuffs of the present disclosure are summarized below, as follows:

The present invention describes a process for novel utilization of the byproducts generated during food and agro-processing operations such as manufacture of yogurt, cheese, wine and fruit juice industries (whey and fruit pomace) into puffed ready-to-eat extruded products without compromising their nutritional qualities. The byproducts are utilized as a source of dietary fiber, phytochemicals, and milk nutrients in the extruded products. Supercritical fluid extrusion (SCFX) was used to process the byproducts into shelf-stable products, which produced expanded, low-density products with good textural qualities at temperatures (~100° C.), much lower than that used in conventional cooking extrusion (130-200° C.). The process of incorporating the complementary streams of fruit pomace and concentrated whey provide puffed crunchy products with a balanced nutritional profile. The extruded products are very light in weight with 0.19-0.35 g/$cm^3$ density and contain 14 g dietary fiber, 93 mg gallic acid equivalent polyphenols, and 652 mg vitamin C equivalent antioxidants in 100 g products.

The process offers simple and straight forward method to utilize the byproducts for food applications. The liquid whey may be concentrated and pumped directly into extruder barrel in lieu of water while processing cereal, snack food or protein based formulations fortified with finely ground fruit pomace up to 10-40% by dry weight. The overall process compromises the following steps: preparing food grade pomace with high nutrient retention, making finely ground pomace powders, preferably concentrating cheese/yogurt whey to 10-30% total solids, introducing the dry formulation into extruder barrel, adding the liquid whey directly into extruder barrel, processing the mixtures of the feed streams in an extruder to form a mass at low-temperature, low-sheer conditions (80-90° C., 100-120 rpm), incorporating supercritical carbon dioxide (SC-$CO_2$) into the dough at high pressure (7.6-10.3 MPa), extruding the SC-$CO_2$ incorporated product through shaped die inserts, and cutting them into various sizes to achieve expanded products.

The ingredient formulations and extrusion process parameters can be tuned and adjusted to produce a variety of extruded products enriched with fruit pomace and whey, acidic or sweet. The processes described below outline our invention to make ready-to eat products, sweet and savory extruded products fortified with fruit pomace and liquid whey. While the process/product disclosed here uses apple and grape pomace, the generic process is also applicable to utilization of other fruit or vegetable products/byproducts in extruded products.

Process for Preparing Edible Foodstuffs from Food Industry Byproducts

In one aspect, the present disclosure provides a process for preparing an edible foodstuff from food industry waste stream byproducts. This process involves the steps of: (i) combining, in an extruder, an extrusion formulation comprising a first food byproduct and at least one additional ingredient; (ii) introducing supercritical carbon dioxide (SC-$CO_2$) into the extruder to mix with the first food byproduct and the at least one additional ingredient; and (iii) producing an edible foodstuff containing the first food byproduct and the at least one additional ingredient, where the edible foodstuff comprises an extrudate prepared under supercritical fluid extrusion (SCFX) conditions.

Supercritical fluids have desirable properties such as gas-like diffusivity and viscosity and liquid-like density and are utilized in a variety of food and industrial applications (Brunner, 2005). Carbon dioxide ($CO_2$) is the most common supercritical fluid and is regarded as an inert, non-toxic, naturally abundant, tunable, and non-flammable solvent with relatively low critical pressure (7.38 MPa) and temperature (31.1° C.) (Zhang and Han 2013). Supercritical fluid extrusion (SCFX) combines extrusion processing with supercritical fluids to overcome the limitations of the conventional high temperature steam extrusion. This is achieved by incorporating supercritical $CO_2$ as a blowing agent instead of steam (Rizvi et al. 1995; Alavi and Rizvi 2005). Since the SCFX process produces low density expanded products at low-temperature and -shear conditions, which allows incorporating heat and shear sensitive ingredients such as proteins (Paraman et al. 2013) and micronutrients (Paramen et al. 2012) in extruded products. Similarly, fruit pomace and fruit-based ingredients can be incorporated as a source of dietary fiber and nutrients to produce expanded, shelf-stable, functional extruded products and breakfast cereals at temperatures below 100° C.

Various parameters (e.g., temperature, pressure, speed) of the SCFX conditions are as described generally and in more detail in the present disclosure. In particular embodiments, the SCFX conditions involve maintaining the extrusion formulation at a temperature of not greater than 100° Celsius during the process of the present disclosure. In another embodiment of the disclosed process, the SC-$CO_2$ is introduced at a constant flow rate. In a further embodiment of the disclosed process, the SC-$CO_2$ is introduced under a high pressure of between about 7.6-10.3 MPa.

In accordance with this process, the first food byproduct is a non-reconstituted liquid food byproduct, and the additional ingredient optionally comprises a second food byproduct.

As used herein, a "food byproduct" refers to a waste stream byproduct resulting from a process in the food industry for yielding a primary food product for consumption by a human or animal. By way of an example, as used herein, a "food byproduct" would include "liquid whey" that is produced as a waste stream byproduct in the process for making yogurt (e.g., Greek yogurt) or cheese, where the yogurt and cheese are the primary food products and the liquid whey is the waste stream byproduct yielded during the process. A further example of a "food byproduct" is "pomace" which is yielded when producing final products from fruits or vegetables. Thus, "fruit pomace" and "vegetable pomace" are also considered "food byproducts" in accordance with the present invention.

As used herein, the term "liquid whey," which is also referred to as milk serum or milk permeate, is the liquid remaining after milk or cultured milk products have been curdled and strained. It is a byproduct of the manufacture of casein, cheese, and other cultured milk products such as yogurt. As provided herein, liquid whey is also referred to in various embodiments of the present disclosure as a non-reconstituted liquid food byproduct. As used in accordance with the present disclosure, liquid whey as a byproduct is different and distinct from whey protein or rehydrated whey or rehydrated whey protein. As discussed elsewhere herein, at the time of the present disclosure, no other teaching, suggestion, or motivation was known in the food industry field that would have prompted one of ordinary skill in the art to use liquid whey in an SCFX process in lieu of water, thereby enabling SCFX extrusion without requiring the hydration step used in conventional SCFX processes.

Thus, unlike conventional SCFX processes, and for the first time known in the food extrusion field, the process of the present disclosure does not require a separate hydration step to yield the extrudate. Instead, as set forth in more detail herein, in certain embodiments, a non-reconstituted liquid food byproduct, particularly liquid whey, is used in lieu of water in the SCFX process.

As set forth above, the process involves the use of a first food byproduct as one of the components of the extrusion formulation. A suitable first food byproduct can include, without limitation, a non-reconstituted liquid food byproduct. As used herein, the term "non-reconstituted liquid food byproduct" refers to a food byproduct that is in liquid form and that has not been reconstituted by adding water or some other hydration agent.

In accordance with one embodiment of this process, the non-reconstituted liquid food byproduct (i.e., the "first food byproduct") is liquid whey. Suitable examples of liquid whey for use in the present process can include, without limitation, liquid cheese whey, liquid yogurt whey, or sweet whey.

In a particular embodiment, the process of the present disclosure uses an extrusion formulation that comprises between about 2 and about 20 percent by dry weight of the liquid whey. In another embodiment, the liquid whey is concentrated to between about 10 and about 40 percent by dry weight prior to the combining step of the process.

In accordance with another embodiment of this process, the at least one additional ingredient is a second food byproduct. Suitable examples of second food byproducts for use in the disclosed process include, without limitation, fruit pomace, vegetable pomace, or a combination of fruit and vegetable pomace. In a more particular embodiment, the extrusion formulation comprises between about 10 and about 40 percent by dry weight of the fruit pomace, vegetable pomace, or the combination of fruit and vegetable pomace.

As discussed herein, fruit pomace is a byproduct that remains after juice extraction from fruits and constitutes about 20-25% of the fresh fruit weight. It is treated as an industrial waste with very little or no economic value and used either as animal feed or returned to farms for composting. Since pomace contains large amount of water (66.4-78.2%, wet basis) and fermentable sugars (3.6%, wb), its direct disposal into soil creates environmental concerns due to the uncontrolled fermentation and high chemical oxygen demand during its degradation, 300 g COD/kg pomace. Therefore, the process of the present disclosure provides an environmental friendly way to use pomace to create value-added foods.

As used herein, suitable examples of fruit pomace for use in the disclosed process can include, without limitation, pomace yielded from fruits such as apples, grapes, pears, plums, bananas, peaches, apricots, oranges, mangoes, papayas, melons, berries, tomatoes, nectarines, figs, dates, grapefruits, clementines, pineapple, and ugli fruit, or any other fruit with skin and seeds.

As used herein, suitable examples of vegetable pomace for use in the disclosed process can include, without limitation, pomace yielded from vegetables such as carrots, peppers, beets, broccoli, cucumber, squash, corn, potatoes, sweet potatoes, peas, beans, pumpkins, zucchinis, turnips, rutabagas, and parsnips, or any other root crop.

In a particular embodiment of the disclosed process, the first food byproduct is liquid whey and the second food byproduct is fruit pomace or vegetable pomace.

In one embodiment of this process, the extrusion formulation further comprises one or more of starch, flour, protein concentrate, functional additives, or flavoring ingredients.

As used herein, suitable protein concentrates used in the extrusion formulation of this process can include, without limitation, milk protein concentrate (MPC) and whey protein concentrate (WPC).

In one embodiment of the disclosed process, the at least one additional ingredient comprises milk protein concentrate (MPC).

In another embodiment of the disclosed process, the at least one additional ingredient comprises both milk protein concentrate (MPC) and fruit pomace or vegetable pomace.

In another aspect, the present disclosure provides an edible foodstuff produced by this process. Various attributes of the edible foodstuff are set forth herein. In a particular embodiment, the edible foodstuff comprises an expanded extrudate having an internal microstructure that is substantially uniform in air cell distribution, size, and density.

In another embodiment, the edible foodstuff retains at least 50 percent of antioxidant and/or phenolic content as compared to that present in the at least one additional ingredient, wherein said additional ingredient is fruit or vegetable pomace.

In a further embodiment, the edible foodstuff is a puffed and ready-to-eat product. By way of example, the edible foodstuff can include, without limitation, a breakfast cereal, a healthy snack, a protein puff, and nutrition bar. In various embodiments, the edible foodstuff is shelf-stable.

As described herein, in various embodiments of the process, liquid whey is used as substitute for water, which is normally used in the separate hydration step in convention SCFX processes. The present disclosure is the first known use of liquid whey in this manner, with the present disclosure teaching, for the first time, the advantages of using liquid whey in an SCFX process for the food extrudation field.

As described herein for the first time, the direct utilization of the liquid whey in the extrusion process of the present disclosure provides energy conservation to the overall process by bypassing the drying step of liquid whey to whey solids. In various embodiments, the liquid whey may be concentrated to varying levels of the total solids and used directly into extruded products. As provided herein, liquid whey improves the overall nutritional quality of the final extruded products. For example, liquid whey contains milk nutrients such as peptides, proteins, sugars, vitamins, and minerals. Further, as provided herein, the liquid whey acts as a plasticizer to provide final products with balanced textural qualities (e.g., adequate hardness, less brittleness) required for end-product intactness during handling and storage, which is essential in certain cases in terms of industrial productivity standards.

More particularly, in one aspect, the present disclosure provides a process to convert the byproducts generated from yogurt, cheese, wine and fruit juice industries into nutritionally superior, shelf-stable expanded extruded products. The process converts agro-industry byproducts such as the pomace directly into extruded products while also optionally using liquid whey in lieu of water during extrusion processing and as a source of added nutrients.

The utilization of the liquid whey provides, inter alia, the following advantages to the process: energy conservation; use of whey as a plastacizer without the need for a separate water hydration step; and improved nutritional qualities of the edible foodstuff product. These advantages of the process of the present disclosure are described in more detail below.

Energy Conservation:

Whey is typically dehydrated and used into extruded products with re-added water (Onwulata et al., 1998). The present invention directly utilizes whey as is or concentrated to varying level of solids and thus bypassing the drying step which is expensive and leads to nutrient destruction.

Whey as a Plasticizer:

Water acts as a plasticizer during extrusion processing. The present invention utilizes liquid whey as a plasticizer instead of water. The lactose and protein in the concentrated liquid whey solids provide final products with balanced textural qualities (adequate hardness, less brittleness) required for end-product intactness during handling and storage, which is essential in terms of industrial productivity standards.

Improved Nutritional Qualities:

Incorporating yogurt/cheese liquid whey improves the overall nutritional quality of extruded products as it contains milk nutrients (peptides, proteins, sugars, vitamins, and minerals) (Table 2). The liquid whey is concentrated to varying level of the total solid contents and used directly into extruded products.

Thus, the present disclosure offers a process to produce consumer acceptable ready-to-eat products with balanced nutrients derived from inexpensive edible byproducts. The fruit pomace contains higher amounts of soluble dietary fiber and bioactive phytochemicals compared to those in cereal grains. Thus, the pomace incorporated extrudates provide low-density, puffed products that are enriched in dietary fiber and phytochemicals.

Figure 4:
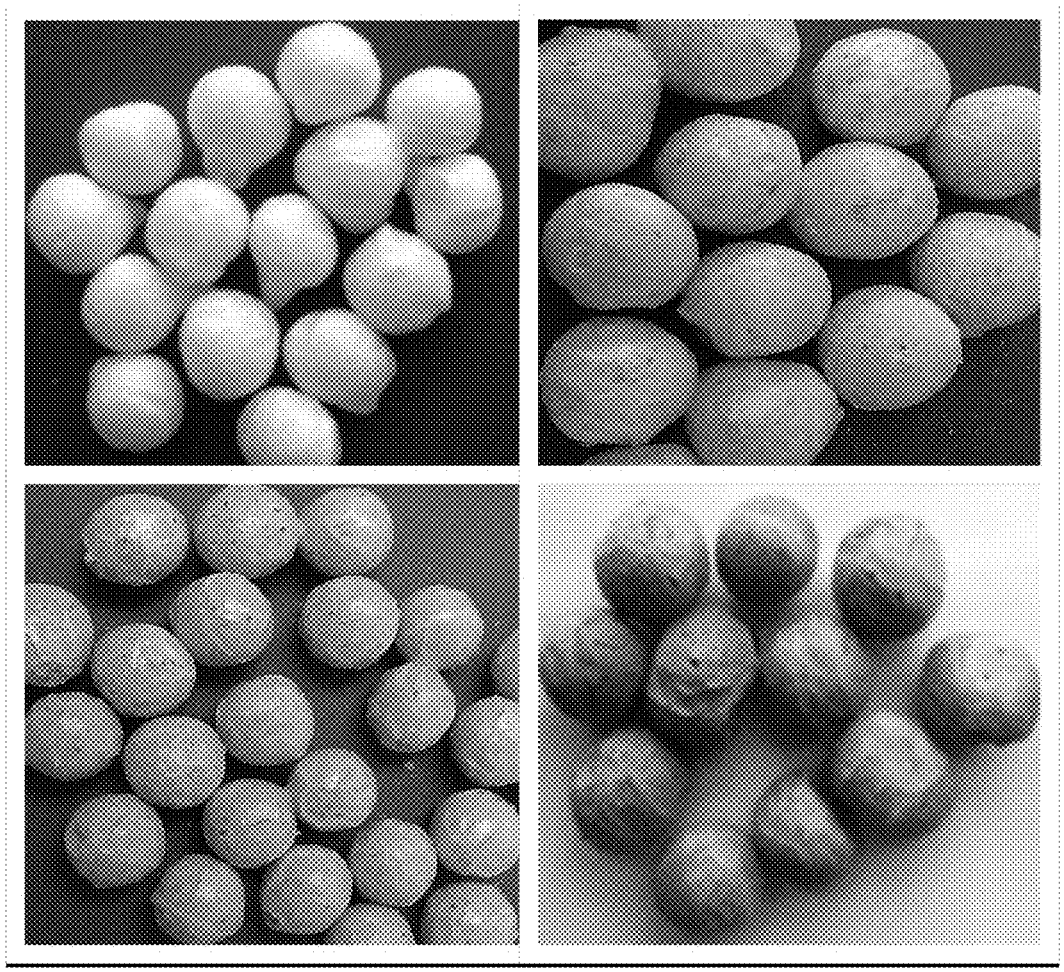
FIG. 4 are photographs of starch-alone, apple pomace, green grape pomace, red grape pomace extruded products made by SCFX process.
Figure 5:
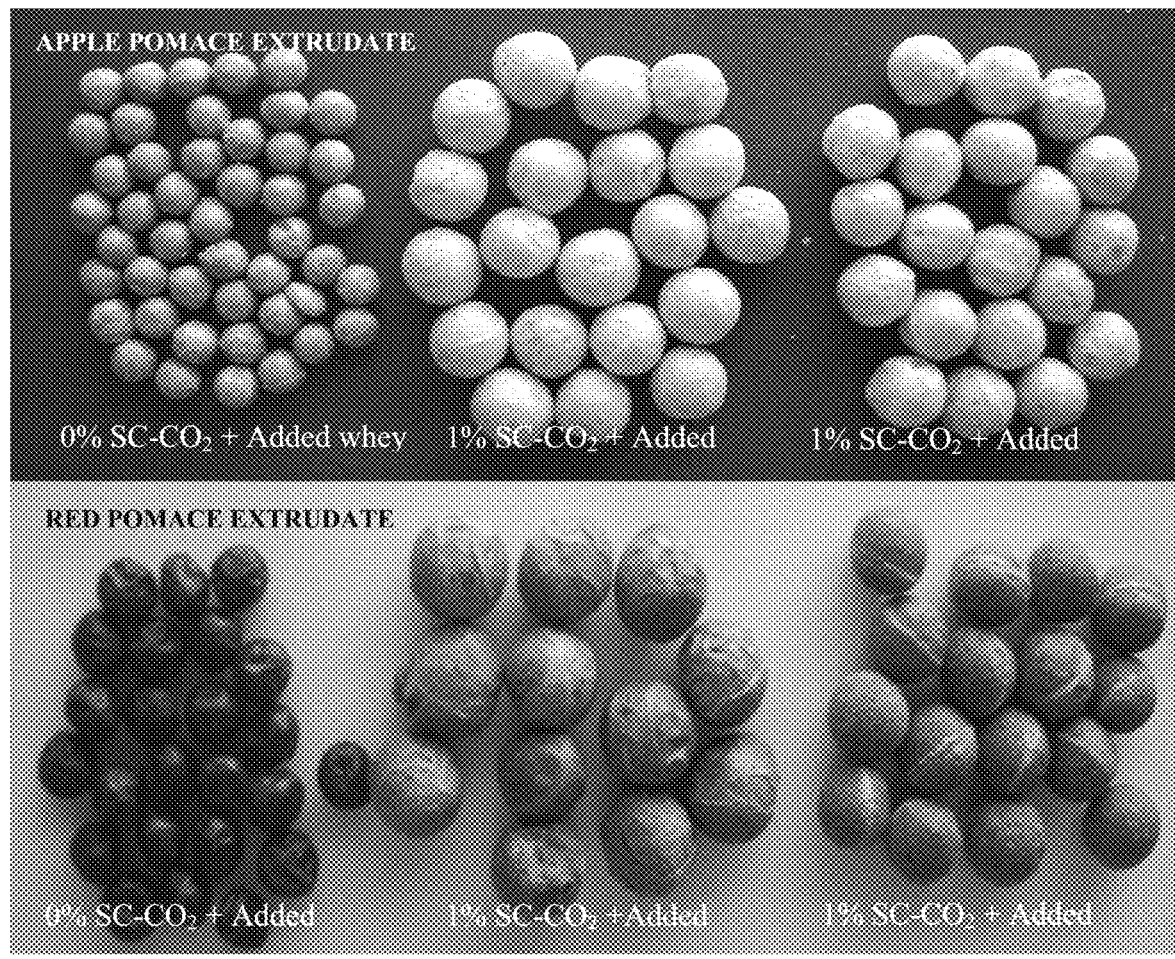
FIG. 5 is a comparison of apple pomace and grape pomace extrudates with water and cheese whey processed by SCFX.
Figure 6A:
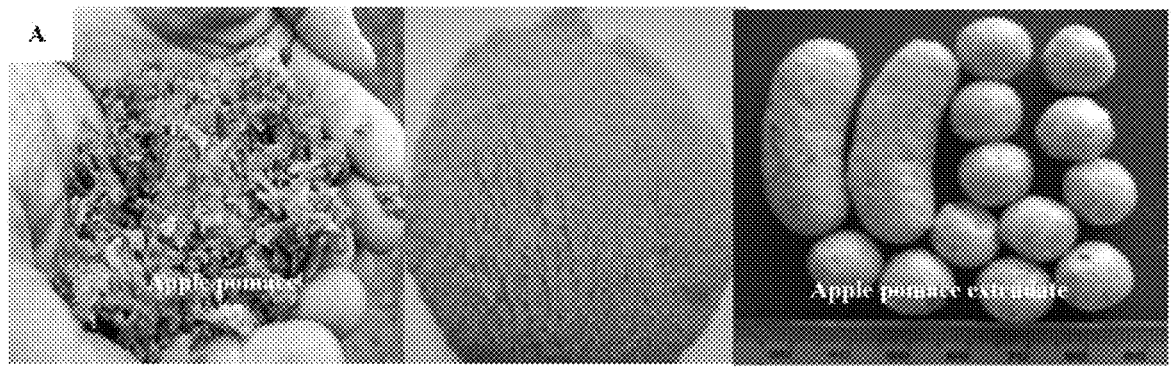
FIGS. 6A-6C are photographs of fruit pomace, finely ground dried pomace, and extruded products made of (A) apple (FIG. 6A), (B) red grape pomace (FIG. 6B), (C) and green pomace (FIG. 6C).
Figure 6B:
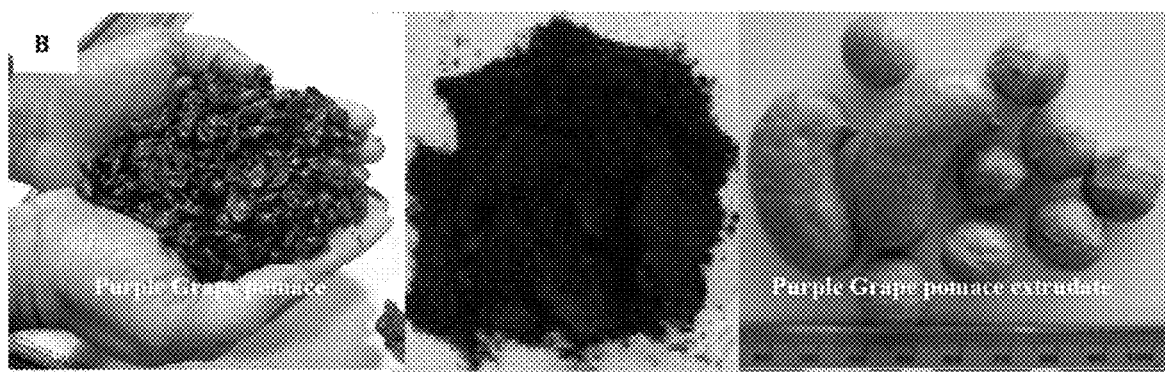
Figure 6C:
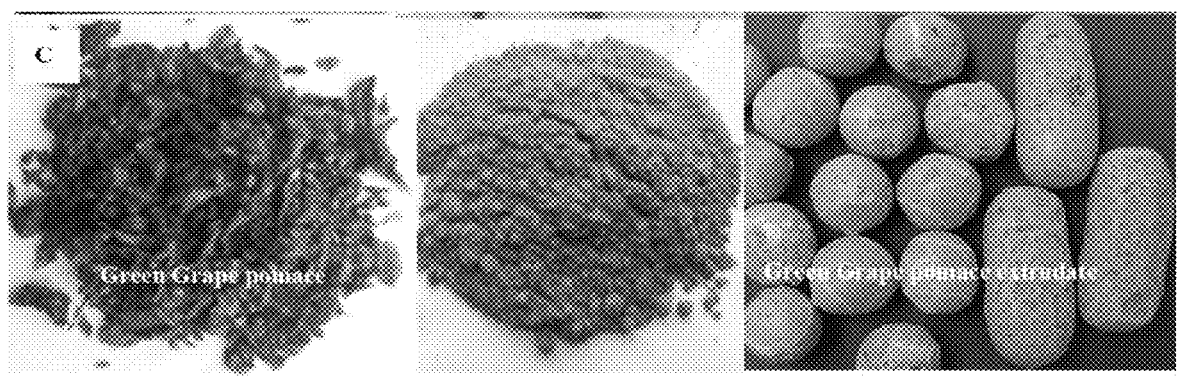
Figures 7A, 7B:
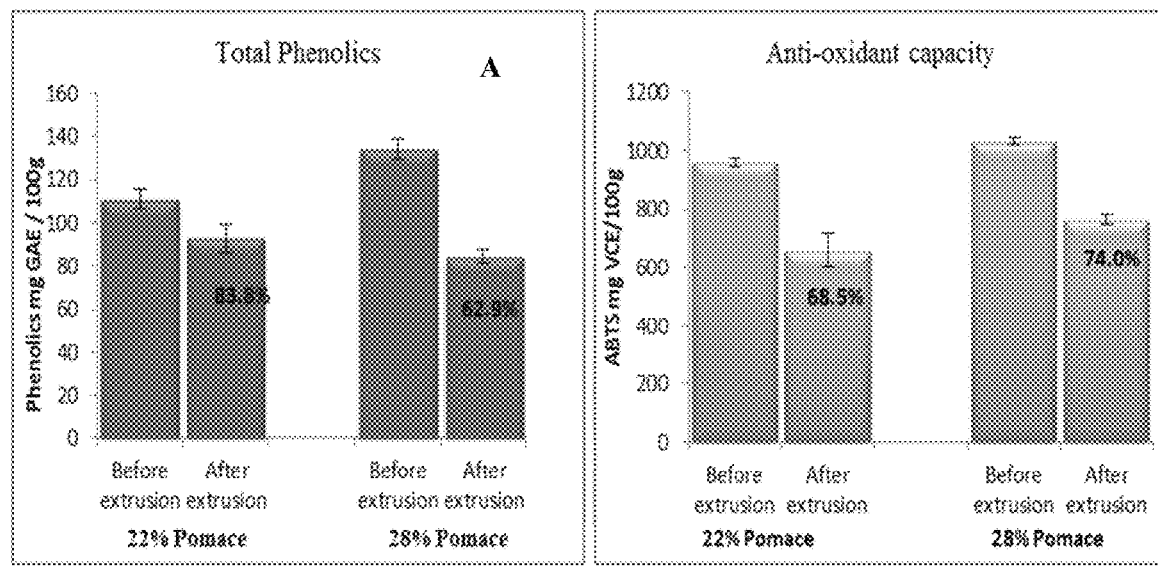
FIGS. 7A-7B are bar graphs illustrating a retention of total phenolics (FIG. 7A) and anti-oxidant capacity (FIG. 7B) of pomace extrudates before and after supercritical fluid extrusion processing.

The natural fruit color is retained in the final product, indicating the preservation of color pigments and the associated bioactive compounds (FIGS. 4-6). About 84% of the total polyphenols and 74% of the total antioxidants of the fruit pomace are also preserved in the extrudates (FIG. 7). The preservation of the above said properties are significantly higher than those reported in conventional steam extruded products; the loss of bioactive compounds reported in the literature ranges from 46 to 90% (Camire et al., 2007; Khanal et al., 2009a, White et al., 2010). Therefore the extruded products produced in the present invention can serve as functional cereals.

By incorporating milk nutrients (e.g., peptides, proteins, sugars, vitamins, and minerals) present in yogurt/cheese whey, the overall quality of extruded products is further improved; the rich amount of minerals in whey can also help reduce the need of added salt in extruded savory products.

By utilizing a modified low-temperature supercritical $CO_2$ ($SC-CO_2$) extrusion, the process is able to maintain the nutritional and sensory qualities of the formulation ingredients used to make the final products. The process, therefore, offers unique nutrient enriched, puffed products while providing opportunities to local processors to better utilize their byproducts sustainably.

In certain embodiments of the present disclosure, the resulting extruded products were very light in weight with 0.19-0.27 g/cm$^3$ piece density and expanded well with an expansion ratio of 7.7-8.4, providing comparatively better textural qualities compared to those made by conventional steam extrusion. Previous studies reported that addition of pomace reduced radial expansion ratio (4-6) of the extrudates made by conventional extrusion (Karkle et al., 2012; Altan et al., 2008a).

Figure 8:
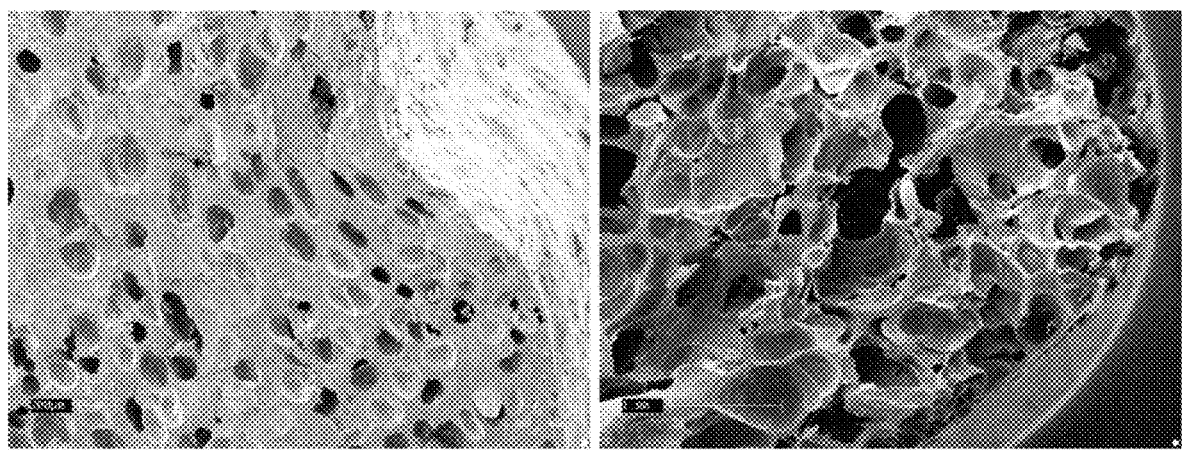
FIG. 8 are scanning electron micrographs illustrating the internal morphology of control (0% SC-$CO_2$) puffed (1% SC-$CO_2$) apple pomace product made by SCFX.

In certain embodiments, the expanded extrudates made in the present invention have unique internal microstructure (uniform air cell distribution, size, and density) compared to the conventional steam extrusion; the air cells are small in size (128-176 μm) and distributed uniformly throughout the products (FIGS. 8-9), which is due to the less forceful, controlled puffing nature of supercritical fluid extrusion. The unique internal cell structure of the extrudate is an indicative of improved textural and sensory attributes. On the other hand most typical puffed products generated by conventional steam expansion have large air cells (0.5-1.0 mm diameter) with less uniform internal micro-structure (Karkle et al., 2012).

The added pomace and whey solids provide final products with balanced sensory attributes (expansion, crispy/crunchiness) and textural qualities (adequate hardness, less brittleness) required for end-product intactness during handling and storage, which can be essential in terms of industrial productivity standards.

The extruded products can be further cut into crisps for use as functional food ingredients in various product applications such as nutrition bars, desert toppings, salads, baked products, etc. Such nutrient enriched extruded products can serve as delivery vehicles to overcome nutritional deficiencies in targeted populations.

Process for Preparing Edible Foodstuffs from Protein Concentrates

In another aspect, the present disclosure provides a process for preparing an edible foodstuff from a protein concentrate. This process includes the steps of: (i) providing, in an extruder, an extrusion formulation comprising a protein concentrate in either liquid or powder form; and (ii) extruding the protein concentrate from the extruder in the form of an expanded extrudate using supercritical carbon dioxide ($SC-CO_2$) under supercritical fluid extrusion (SCFX) conditions, thereby yielding an edible foodstuff comprising the expanded extrudate of the protein concentrate.

In accordance with this process, in various embodiments, the protein concentrate is milk protein concentrate (MPC). In various other embodiments, the concentrate is yogurt concentrate (powder).

In certain other embodiments of this process, the extrusion formulation further includes fruit or vegetable pomace. Suitable examples of the types of fruit and vegetable pomace are as set forth herein.

In another aspect, the present disclosure provides an edible foodstuff produced by this process.

Further aspects of this process of the present disclosure and the edible foodstuff produced by this process are also described in Example 2.

EXAMPLES

The following examples are intended to illustrate particular embodiments of the present invention, but are by no means intended to limit the scope of the present invention.

Example 1

Liquid Whey and Fruit Pomace in the Production of a Foodstuff

Figure 2:
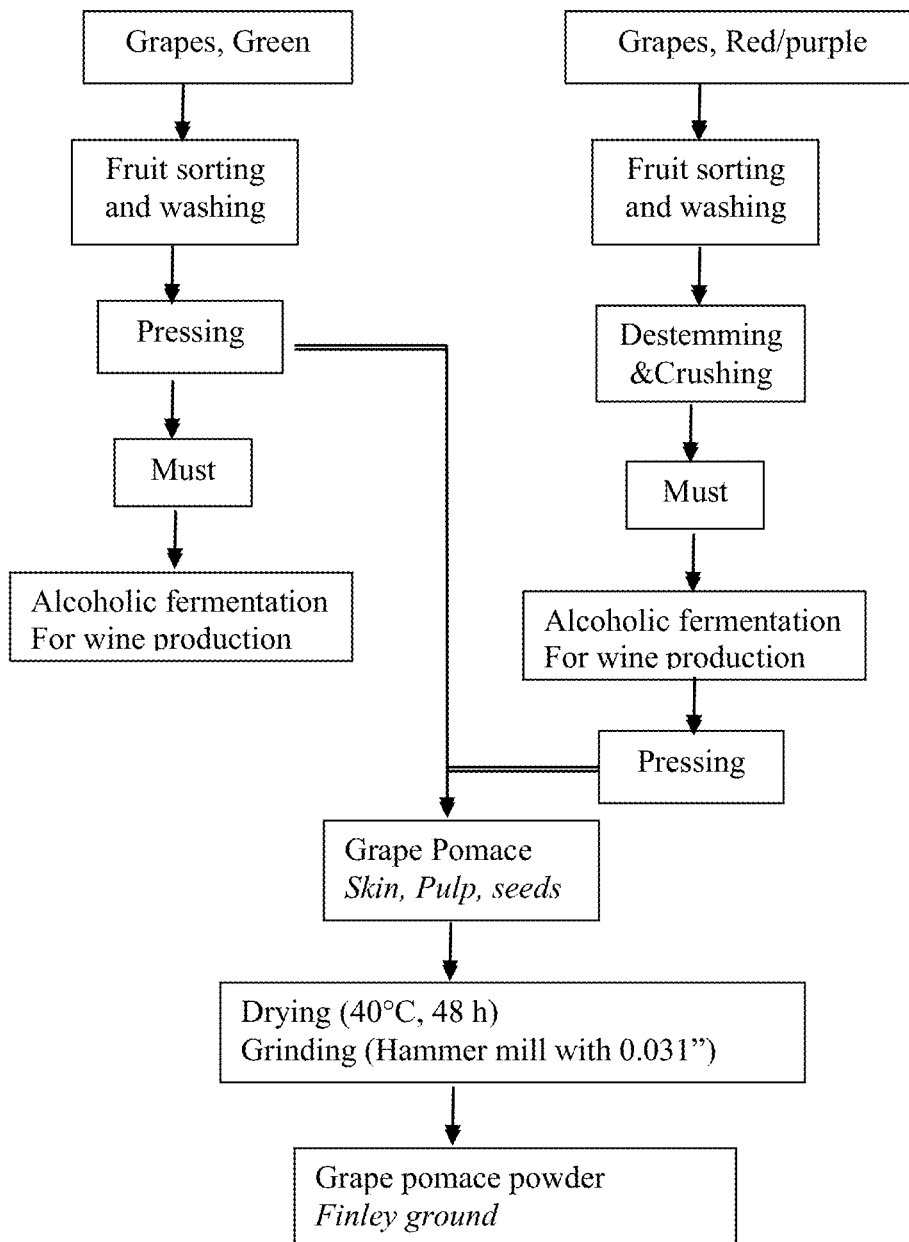
FIG. 2 is a flowchart for recovering food grade grape pomace from wine processing.

Various aspects of the process for using liquid whey and fruit pomace to produce a new and nutritious foodstuff are outlined below, as follows:

(i) Fruit pomace preparation. Apple and grape pomace was obtained from the New York State Agricultural Experiment Station juice and wine processing pilot plants (Geneva, N.Y.). The byproducts are processed by similar processes described in FIG. 1 and FIG. 2. The wet apple pomace contained a moisture content of 71% and pH of 4.8. The grape pomace contained a moisture content of 76%. The pH was 3.3-3.8. The fruit pomaces were dried in a hot air oven at 40° C. for 48 hours to moisture content of 5-8%. The dried pomaces were finely ground with a hammer mill to pass through a 0.031 inch screen.

(ii) Acid whey preparation. Acid whey generated from our dairy processing facility was concentrated to a desired total solid content by using a low-temperature vacuum evaporator. The concentrated whey contained ~10-30% total solid content (%, dw) and pH of 4.2.

(iii) Feed formulation. Extrusion formulations consisting 10-40% fruit pomace by dry-weight and other required dry ingredients (70-76% starch, 2% functional additives, <1% flavoring ingredients) were mixed for 9 minutes in 0.14 m3 ribbon blender (Littleford Day Inc., Florence, Ky., USA) to ensure uniform mixing.

Figure 3:
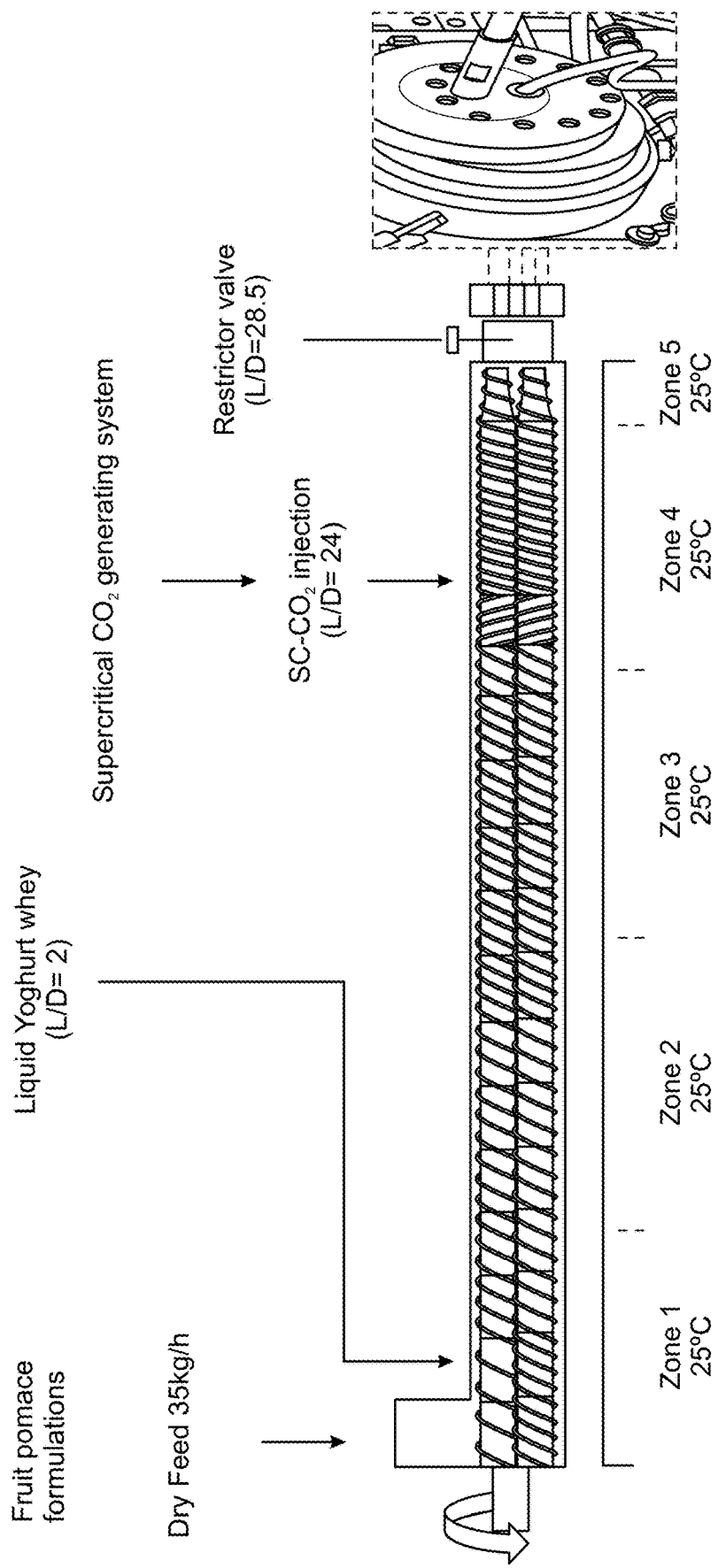
FIG. 3 is a schematic of supercritical-$CO_2$ extrusion process used to produce extruded products fortified with pomace and liquid whey.

(iv) Supercritical fluid extrusion (SCFX). The dry-blend formulations were extruded by using a pilot-scale Wenger TX-52 Magnum co-rotating twin screw extruder (Wenger Manufacturing, Sabetha, Kans., USA) with a length to diameter ratio (L/D) of 28.5:1 (Rizvi et al., 1995). A block diagram of the screw profile with extrusion parameters is shown in FIG. 3. The extruder was operated at a feed rate of 35 kg/h and screw speed of 100-120 rpm. The barrel temperature in the all 5 barrel zones were set to maintain at ~25° C. by circulating chilled brine (−10° C.) through barrel jackets.

(v) The concentrated whey was directly pumped into the extruder barrel while processing the fruit pomace in the extruder at flow rate of 20-40% of the dry-feed flow rate, which will give dough water content of 18-32%.

(vi) A pilot scale supercritical fluid system was used to generate and inject $SC-CO_2$ at a constant flow rate (7.6×

10-5 kg/s) into the barrel through four valves located at L/D of 24. The SC-CO$_2$ was injected at pressure of 1100 psi (7.58 MPa) to maintain a continuous flow of SC-CO$_2$ into the product melt (Rizvi et al., 1995).

(vii) The product temperature at the die-exit was ~80-90° C. A flow restrictor was used to maintain the die pressure at ~10 MPa (1500 psi). The product melt was forced through one die insert with 4.2 mm diameter circular openings and cut by 2 bladed knife rotating at 600-900 rpm to obtain ball shaped products. The final products were dried at 85° C. to ~5-8% moisture content.

Product characterization: Piece density of the extrudates was measured using the sand displacement method; piece density was defined as the ratio of the mass of the sample to that of its volume that includes internal pores but excludes the void or space among the pieces. Bulk density of the extruded pomace was measured by filling a container of known volume with the product; bulk density is defined as the mass of the particles divided by the volume they occupy that includes internal pores plus the space between the particles. The procedure was repeated five times for each set of samples. Expansion ratio was calculated by dividing the cross sectional area of the extrudates by the cross-sectional area of the die opening. An average diameter of 10 samples was used to determine the expansion ratio of each set of samples.

The textural properties of the pomace puffs were measured using a TA-XT2 texture analyzer and Texture Exponent 32 software (Micro Systems, Godalming, UK). The extruded puffs were equilibrated in a humidity chamber containing saturated calcium chloride (30% RH) for 48 h and compressed to 80% of their average original diameter using a 35 mm compression plate at a test speed of 0.2 mm/s. The peak force (N), number of peaks, and initial gradient (N/mm) of the force-deformation curve were recorded and analyzed to calculate the hardness, crispiness, and compression modulus of the products, respectively. An average of 12 samples was used to determine the properties.

Total phenolic contents were determined by the Folin-Ciocalteu assay (Singleton and Rossi 1965). The antioxidant capacities of the pomace and the extrudates were evaluated using the method described by Prior et al., 2005. The internal microstructures of the pomace extrudates were observed by LEICA 440 scanning electron microscope. The samples were cut into a thin slice, mounted on aluminum stubs with double-sided adhesive tape, coated with gold-palladium, and examined at an intensity of 5 kV.

Apple and Grape Pomace Extrudates

Nutrient Retention.

The appearance of the puffed extruded products of apple, green grape, purple grape pomace are shown in FIGS. 4-6. As may be noted, the natural color of the pomace was preserved during the whole production process, indicating that the overall production process used in this process retained the color and the associated bioactive nutrients in the final products. The color pigments and bioactive compounds are typically sensitive to heat and shear used in conventional steam extrusion. The low-temperature and low-shear conditions used in the present SCFX process protected the product color and nutrient.

From the data provided in FIG. 7, it can be seen that our process retained 84% of the total phenolics and 74% of total antioxidants present in the pomace. The losses were significantly lower than those reported in conventional steam-based extrusion. Depending on the severity of the conventional steam extrusion, a wide range of bioactive compound loss (46-65%) has been reported. Therefore the present invention provides an effective process-based strategy to fortify the heat sensitive bioactive phytochemicals and nutrients in low-moisture (5-8%) expanded products.

Nutrient Enrichment.

Nutrient content of the apple and grape pomaces are given in Table 1. The composition of the cheese acid and sweet whey is given in Table 2. The estimated nutrient content of the resulting pomace and whey incorporated SCFX-generated puffed products are given in Table 3. Also shown for comparison purposes in Table 3 is a typical composition of commercial puffed cereal product. As may be noted, by incorporating pomace to produce the puffed products, the dietary fiber content increased from 0.8 to 14 g/100 g product compared to the control commercial product. Since 14% fiber was incorporated in the extruded puffed products, the pomace incorporated products can be considered as healthy functional food as well as 'whole grain' functional cereals.

TABLE 1

Typical composition of apple and grape pomace [a]

| Composition | Apple pomace | White grape pomace (Muller Thurgau) | Red grape pomace (Pinot Noir) |
|---|---|---|---|
| Total dietary fiber (%, dwb) | 83.3 | 28.0 | 56.3 |
| Insoluble dietary fiber (%) | 63.3 | 27.3 | 54.6 |
| Soluble dietary fiber (%) | 20.0 | 0.72 | 1.7 |
| Protein (%) | 6.4 | 6.5 | 12.1 |
| Fat (%) | 5.4 | 2.6 | 4.7 |
| Soluble sugars (%) | 2.3 | 55.8 | 1.4 |
| Minerals (%) | 1.4 | 2.5 | 6.2 |
| Condensed Tannins (%) | 4.2 | 8.5 | 19.8 |
| Polyphenolic compounds (mg GAE/g DW) [b] | 3.8 | 15.8 | 21.4 |
| Antioxidant capacity (ABTS) (mg VCE/g DW) [b] | 12.7 | | |

[a] Adapted from, Bibbins-Martineza 2010, Deng et al., 2011, Karkle et al., 2012;
[b] Experimental values.
GAE = gallic acid equivalent,
VCE = vitamin C equivalent

TABLE 2

Composition of sweet and acid cheese whey

| Composition | Sweet whey | Acid whey |
|---|---|---|
| Water (%, wb) | 93-94 | 94-95 |
| Dry matter (%, wb) | 6-6.5 | 5-6 |
| Lactose (%, wb) | 4.5-5 | 3.8-4.3 |
| Lactic acid (%, wb) | traces | up to 0.8 |
| Total protein (%, wb) | 0.8-1.0 | 0.8-1.0 |
| Whey protein (%, wb) | 0.6-0.65 | 0.6-0.65 |
| Citric acid (%, wb) | 0.1 | 0.1 |
| Minerals (%, wb) | 0.5-0.7 | 0.5-0.7 |
| pH (actual acidity) | 6.2-6.4 | 4.6-5.0 |
| Soxhlet-Henkel value of titrable acidity | about 4 | 20-25 |

TABLE 3

Estimated nutrient composition of apple pomace incorporated extrudates and commercial sample [a]

| Nutrients | Apple pomace extrudate (g/100 g product) [b] | Apple pomace and cheese whey extrudate (g/100 g product) [c] | Commercial Jax (g/100 g product) [d] |
|---|---|---|---|
| Total dietary fiber | 14.2 | 14.2 | 0.1 |
| Protein | 1.5 | 2.4 | 7.1 |
| Fat | 1.2 | 1.6 | 38.8 |
| Carbohydrates | 77.4 | 81.3 | 49.4 |
| Soluble sugars/lactose | 0.5 | 4.4 | — |
| Minerals | 0.3 | 0.9 | — |
| Condensed Tannins | 0.9 | 0.9 | — |
| Polyphenolic compounds (mg GAE/100 g DW) | 80 | 80 | — |
| Antioxidant capacity (ABTS) (mg VCE/100 g DW) | 280 | 280 | — |
| Total calories | 376.4 | 388.0 | 564.4 |

[a] Calculated based on ingredient composition on dry weight basis,
[b] Formulations containing 22% apple pomace, 76% pregel starch, 1% lecithin, and 1% distilled monoglycerides.
[b] Formulations containing the above formulation with added liquid whey at 5.1% on dry weight basis.
[d] Bachman Cheese Flavored Corn Snacks, Crunchy Jax Twists Similarly phytochemicals and milk-based mineral contents improved significantly. The extruded products contained 93 mg gallic acid equivalent polyphenols, and 652 mg vitamin C equivalent antioxidants in 100 g final products when incorporating 22% apple pomace. The total calories of the pomace incorporated products decreased to 376.4 calories/100 g compared to the commercial product (564.4 calories/100 g). The fat content of the pomace incorporated products were only 1.5% compared to that of commercial product (38.8%). The fruit pomace incorporation in extruded products significantly enhanced the nutritive value of the final products and their health potentials.

Physical Characteristics.

The textural characteristics of the pomace and cheese whey incorporated puffed products are given in Table 4 (apple pomace products) and Table 5 (grape pomace products). All the puffed products produced by SCFX gave the best textural qualities. The products were very light in weight with 0.19-0.27 g/cm$^3$ piece density and expanded well with an expansion ratio of 7.7-8.4.

TABLE 4

Textural characteristics of apple pomace and liquid-cheese whey incorporated extrudates and commercial sample [a]

| Physical characteristics | Control-Starch extrudates | Apple pomace extrudate [b] | Apple pomace and cheese whey extrudate [c] | Commercial Jax [d] |
|---|---|---|---|---|
| Piece density (g/cm$^3$) | 0.21 b | 0.29 a | 0.27 a | 0.17 c |
| Bulk density (g/cm$^3$) | 0.14 b | 0.22 a | 0.24 a | 0.12 b |
| Expansion ratio | 10.7 a | 8.6 b | 8.5 b | — |
| Hardness (N) | 22.1 ab | 20.8 b | 25.2 a | 12.2 c |
| Crispiness (no. of peaks) | 18.3 b | 17.5 bc | 15.8 bc | 25.2 a |
| Compressive modulus (N/mm) | 9.4 c | 16.8 a | 9.3 c | 13.8 b |

[a] Means in the same row followed by the same letter are not significantly different (p < 0.05).
[b] Formulations containing 22% apple pomace, 76% pregel starch, 1% lecithin, and 1% distilled monoglycerides.
[c] Formulations containing the above formulation with added liquid whey at 5.1% on dry weight basis.
[d] Bachman Cheese Flavored Corn Snacks, Crunchy Jax Twists

TABLE 5

Physical characteristics of grape pomace and liquid cheese-whey incorporated extrudates

| Physical characteristics | Control-Starch extrudates | Grape pomace extrudate [b] | Grape pomace and cheese whey extrudate [c] |
|---|---|---|---|
| Piece density (g/cm$^3$) | 0.21 b | 0.19 ab | 0.23 a |
| Bulk density (g/cm$^3$) | 0.14 ab | 0.11 b | 0.16 a |
| Expansion ratio | 10.7 a | 8.4 b | 7.7 c |
| Hardness (N) | 22.1 a | 14.1 c | 18.4 b |
| Crispiness (number of peaks) | 18.3 a | 16.5 b | 12.6 c |
| Compressive modulus (N/mm) | 9.4 c | 36.9 a | 25.9 b |

[a] Means in the same row followed by the same letter are not significantly different (p < 0.05).
[b] Formulations containing 22% apple pomace, 76% pregel starch, 1% lecithin, and 1% distilled monoglycerides.
[b] Formulations containing the above formulation with added liquid whey at 5.1% on dry weight basis.

When incorporating 22% pomace and 5% concentrated cheese-whey by dry-weight in the fortified puffed extrudates, certain textural qualities decreased compared to the control starch-alone puffed product; expansion decreased from 10.7 to 8.6, piece density increased from 0.21 to 0.27 g/cm$^3$, bulk density increased from 0.14 to 0.23 g/cm$^3$ and hardness increased from 22.1 to 25.2 N (Table 4). The reduced textural qualities of the pomace extrudates were due to reduced gas holding capacity of the dough caused by the fiber in the pomace. As a result, the expansion decreased and the piece density and hardness increased. A similar trend was observed in grape pomace-incorporated products (Table 5).

When liquid cheese-whey was incorporated at 5.1% by dry weight, the textural qualities of the apple pomace extrudates remained same with and without added whey; however, certain textural qualities decreased in grape pomace extrudates: expansion degreased from 8.4 to 7.7, piece density increased from 0.19 to 0.23 g/cm$^3$, bulk density increased from 0.11 to 0.16 g/cm$^3$ and hardness increased from 14.1 to 18.4 N. However, all puffed products fortified with fruit pomace and liquid whey were very crispy and showed good overall textural characteristics. Both of the SCFX processed products (pomace incorporated and cheese whey fortified products) showed a comparable crispiness with control product and the commercial product evaluated in this study (Tables 4 & 5). Typical commercial low-density puffed snakes prepared by conventional steam extrusion have a density from 0.02-0.7 g/cm3. Our pomace incorporated products are low in density and highly expanded and thus provide crispy puffed products with good textural qualities.

Internal Morphology.

Scanning electron microscope was used to evaluate the internal morphology of the extruded products. The micrographs presented in FIG. 8 confirmed that the puffed pomace products made by SCFX process contained unique internal morphology with large amounts of uniformly expanded air cell compared to the control sample processed without supercritical $CO_2$. Furthermore, the products made from the present SCFX process produce extrudates with more uniform internal cell structure compared to conventional steam extrusion, which is due to the less forceful, controlled puffing nature of SC-$CO_2$ assisted extrusion. The unique internal cell structure of the pomace products was an indicative of improved textural and sensory attributes of the extrudates.

Figure 9:
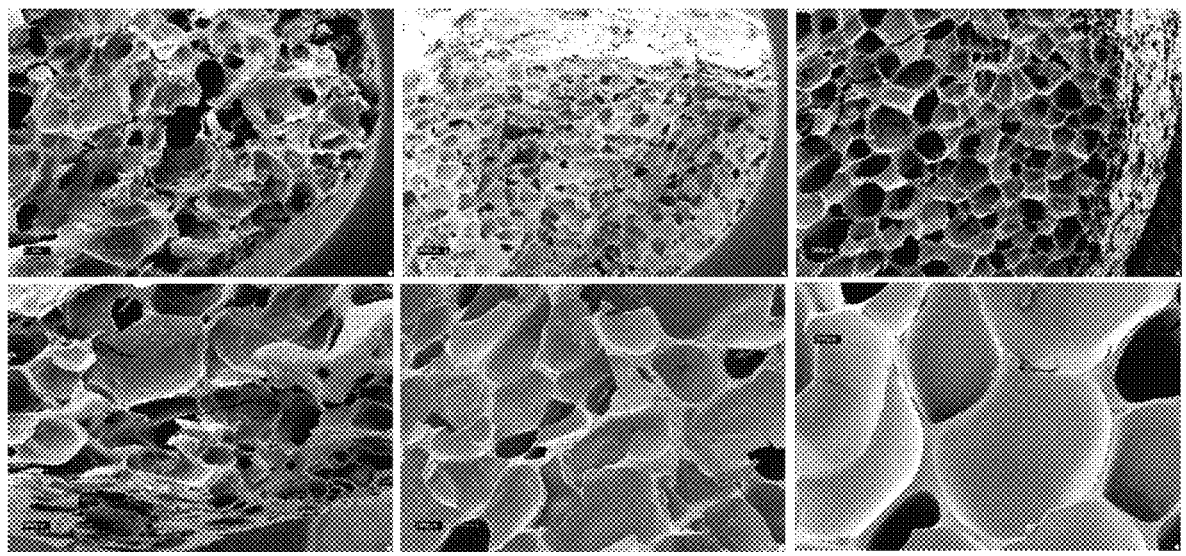
FIG. 9 are scanning electron micrographs of puffed product made by SCFX with 1% SC-$CO_2$: apple pomace extrudate (left panel), grape pomace extrudate (middle panel), and starch-alone extrudate (right panel). Micrographs in the upper and lower rows represent low (~25×) and high (~60×) magnifications, respectively.

The average diameter of the internal air cell in the 22% apple pomace puffs was 176±57 μm. The control puffs without pomace contained a greater number of smaller air cells (128±30 μm, which were distributed uniformly throughout the extrudate (FIG. 9). When the apple pomace was incorporated, the number of opened cells increased, and number of air cell density decreased, resulting in less expanded and collapsed internal structure. However, the grape pomace extrudates showed appreciable porous microstructure very similar to that of starch-alone extrudates. All the SCFX processed expanded products have with unique internal microstructure; the air cells were small in size (128-176 μm) and they were distributed uniformly throughout the products. On the other hand most typical puffed products generated by conventional steam expansion have large air cells (1-2 mm diameter) with less uniform internal micro-structure.

An example utilization of apple and grape pomace in sweet and savory extruded snacks is illustrated with the three modified formulations listed in Table 6. The ingredient formulations were modified in these products with the objective of further improving the nutritional and sensory qualities of the pomace incorporated extrudates. The extruder parameters and operating conditions used in this process are summarized in Table 7. All other methods for feed preparation, mixing, preconditioning, extrusion, product shaping, and drying were performed as described previously in the general methodology of the invention.

TABLE 7

SCFX process parameters for flavored apple-grape pomace extruded puffs

| Process parameters | Process conditions Apple Pomace -Pie Puffs flavor | Apple Pomace- Spicy Flavor | Grape pomace- Cheese flavor |
|---|---|---|---|
| Feed rate (kg/h) | 35 | 35 | 35 |
| Pre-conditioner speed | 200 | 200 | 200 |
| Water/steam flow in pre-conditioner (%) | 0 | 0 | 0 |
| Extruder motor load (%) | 15 | 13 | 14 |
| Extruder screw speed (rpm) | 100 | 100 | 120 |
| Water flow (% Feed) | 22 | 22 | 22 |
| Barrel temperature (° C.) | 21-27 | 23-25 | 25-27 |
| Die pressure (MPa) | 11.7 | 11.7 | 10.3 |
| SC-$CO_2$ injection rate (kg/s) | $7.6 \times 10^{-5}$ | $7.6 \times 10^{-5}$ | $7.6 \times 10^{-5}$ |
| SC-$CO_2$ injection pressure (MPa) | 7.6 | 7.6 | 7.6 |
| Specific mechanical energy (kJ/kg) | 54.2 | 47.7 | 61.5 |
| Extrudate temperature (° C.) | 83.2 | 81 | 86 |

Figure 10:
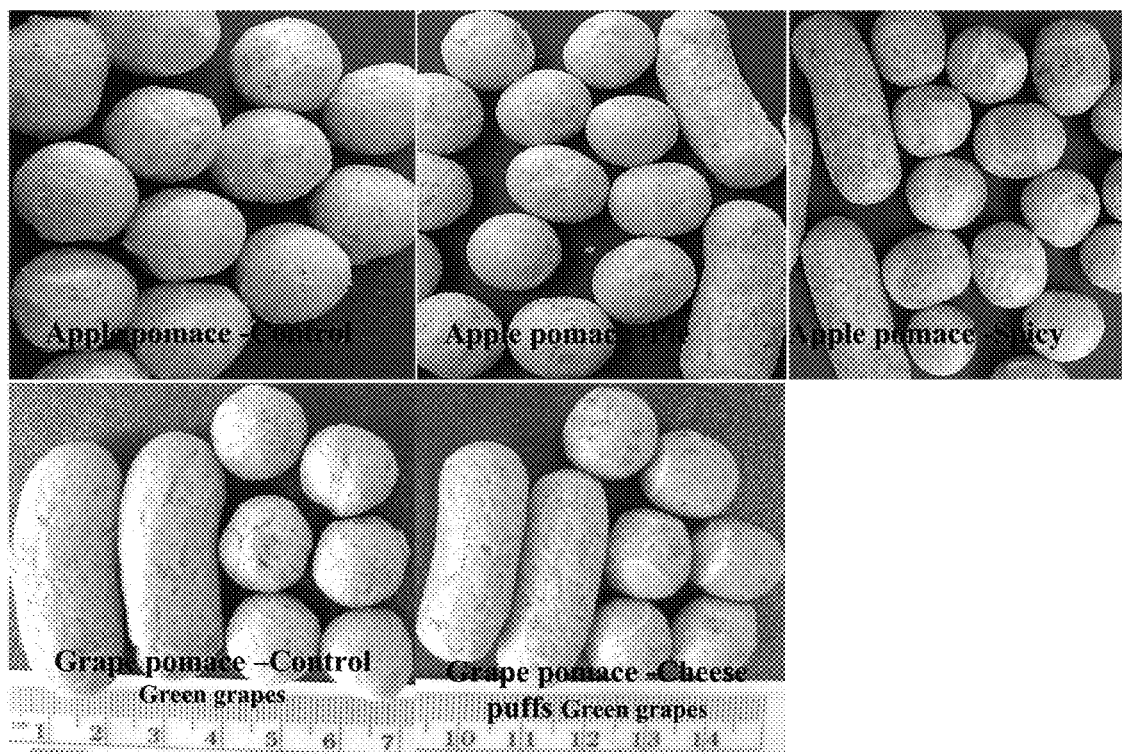
FIG. 10 are photographs of flavored apple or grape pomace incorporated extruded puffs made by SCFX.

The appearance of the representative extrudates produced by SCFX is shown in FIG. 10. The puffed products showed good appearance and color retention. The textural characteristics of the pomace incorporated puffed products are given in Table 8. Although certain textural qualities decreased compared to the control starch-alone or starch-pomace base formulation products, the puffed products showed good textural qualities. The bulk density (0.30-0.35 g/cm$^3$) and piece (0.23-0.27 g/cm$^3$) density of the products remained comparable with those of typical commercial low-density puffed products (0.2-0.7 g/cm$^3$).

TABLE 8

Physical characteristics of the flavored apple-grape pomace extruded puffs and commercial sample [a]

| Physical characteristics | Apple pomace- Pie puffs flavor | Apple pomace- Spicy flavor | Grape pomace- Cheese flavor | Commercial Jax [b] |
|---|---|---|---|---|
| Piece density (g/cm$^3$) | 0.35 | 0.30 | 0.34 | 0.17 |
| Bulk density (g/cm$^3$) | 0.27 | 0.26 | 0.23 | 0.12 |
| Expansion ratio | 6.8 | 7.0 | 6.1 | — |
| Hardness (N) | 28.0 | 30.4 | 27.3 | 12.2 |

TABLE 6

Ingredient composition of flavored apple-grape pomace extruded puffs
Ingredient formulation for fruit pomace extrudate (% w/w)

| Apple Pomace-Pie Puffs flavor | Apple Pomace-Spicy Flavor | Grape pomace-Cheese flavor |
|---|---|---|
| 22% Apple pomace | 22% Apple Pomace | 22% Grape Pomace |
| 48% Pregel cornstarch | 56% Pregel cornstarch | 56% Pregel cornstarch |
| 12% Soy protein isolate | 10% Whey Protein Concentrate | 10% Whey Protein Concentrate |
| 7% Brown Sugar | 1% Salt | 1% Salt |
| 7% Dried yogurt powder | 1% Lecithin | 1% Lecithin |
| 1% Lecithin | 1% Dimodon | 1% Dimodon |
| 1% Diomodon | 2% Maltodextrin | 2% Maltodextrin |
| .8% Vanilla flavored extract | 6.0% Spicy Seasoning | 1% Sour Cream |
| .5% Natural Apple flavoring | | 1% Milk powder |
| .6% Salt, .3% Cinnamon | | 4.5% Cheese seasoning |
| .4% Citric acid, .2% Nutmeg | | |

TABLE 8-continued

Physical characteristics of the flavored apple-grape pomace extruded puffs and commercial sample [a]

| Physical characteristics | Apple pomace-Pie puffs flavor | Apple pomace-Spicy flavor | Grape pomace-Cheese flavor | Commercial Jax [b] |
|---|---|---|---|---|
| Crispiness (no. of peaks) | 14.1 | 10.6 | 12.1 | 25.2 |
| Compressive modulus (N/mm) | 13.1 | 13.6 | 16.7 | 13.8 |

[a] Means in the same row followed by the same letter are not significantly different (p < 0.05).
[d] Bachman Cheese Flavored Corn Snacks, Crunchy Jax Twists Table 9 shows that nutrient content of the apple pomace incorporated products obtained in this present invention had significantly better nutritional profile compared to the commercial products. Specifically, dietary fiber and protein contents improved compared to the control products. Total protein content of the product improved from 1.5 to 12.1% and the total dietary fiber content also improved from 14.2 to 16.5 g/100-g product compared to the base apple pomace product. Furthermore, the pomace incorporated products contained good amount of phenolics in the final product (80 mg/100 g product); whereas, the commercial product contained negligible amounts of dietary fiber and phytochemical. These example formulations demonstrated that the fruit pomace can be used in the production of cereal based puffed products with added nutrients and functional ingredients. The naturally colored, nutrient enriched products are ideal for ready-to-eat functional food such as breakfast cereals and snacks.

TABLE 9

Estimated nutrient composition of flavored apple pomace extruded puffs and commercial sample [a]

| Nutrients | Apple pomace extrudate (g/100 g product) [a] | Apple Pomace-Pie Puffs flavor (g/100 g product) [b] | Commercial Jax (g/100 g product) |
|---|---|---|---|
| Total dietary fiber | 14.2 | 16.5 | 0.1 |
| Protein | 1.5 | 12.1 | 7.1 |
| Fat | 1.2 | 1.5 | 38.8 |
| Carbohydrates | 77.4 | 54.2 | 49.4 |
| Soluble sugars | 0.5 | 7.6 | — |
| Minerals | 0.3 | 0.9 | — |
| Condensed Tannins | 0.9 | 0.9 | — |
| Polyphenolic compounds (mg GAE/100 g DW) | 80 | 80 | — |
| Antioxidant capacity (ABTS) (mg VCE/100 g DW) | 280 | 280 | — |
| Total calories | 376.4 | 334.5 | 564.4 |

[a] Calculated based on ingredient composition on dry weight basis
[b] Formulations containing 22% apple pomace, 76% pregel starch, 1% lecithin, and 1% distilled monoglycerides.
[b] Modified formulation listed in Table 6
[d] Bachman Cheese Flavored Corn Snacks, Crunchy Jax Twists By using supercritical fluid extrusion the present invention demonstrates the effective utilization of the byproducts generated from various food process operations as a source of health enhancing dietary fiber and nutrients in low-density, puffed, products while providing opportunities to local processors to better transform their byproducts into value-added, edible products.

Additional Embodiments of the Extruded Foodstuff of the Present Disclosure

The following examples are intended to illustrate particular embodiments of the present invention, but are by no means intended to limit the scope of the present invention.

In various aspects, the present invention describes a process for novel utilization of the byproducts (e.g., whey and fruit pomace) generated during food and agro-processing operations such as those manufactured in the yogurt, cheese, wine, and fruit juice industries into puffed ready-to-eat extruded products without compromising their nutritional qualities.

One embodiment of a procedure in accordance with the present disclosure includes the following steps, attributes, or formulations:

(a) Obtaining food grade pomace by removing inedible portions such as seeds, stem from pomace. The pomace was dried in a hot air oven at low temperature (40° C. for 48 h) to moisture content of 5-8%. The dried pomace was ground into fine powder with a hammer mill to pass through a 0.031-0.048 inch screen.

(b) Extrusion formulations consisting of 10-40% fruit pomace by dry-weight and other required dry ingredients (50-76% starch/flour/protein concentrate, 2% functional additives, <1% flavoring ingredients)

(c) Concentrating liquid whey generated from dairy processing operations (Greek yogurt, cheese manufacture) is to ~10-40% total solid content (%, dw) by using a low-temperature vacuum evaporator.

(d) Adding concentrated liquid whey is directly into the extruder barrel while processing the fruit pomace in the extruder at a flow rate of 20-40% of the dry-feed flow rate, which will give dough a water content of 18-32% and add 3-15% whey solids to the feed formulation.

(e) Maintaining the extruder barrel temperature in the all 5 barrel zones at ~25° C. by circulating chilled brine (−10° C.) through barrel jackets. The product temperature at the die-exit is ~80-90° C.

(f) Injecting supercritical carbon dioxide (SC-$CO_2$) as a blowing (expansion) agent into the product melt at a constant flow rate (7.6×10−5 kg/s) into the barrel through four valves located at L/D of 24 at pressure of 1100 psi (7.58 MPa) (Rizvi et al., 1995).

In certain embodiments, the process of the present disclosure offers unique puffed products that are enriched in dietary fiber and phytochemicals, as follows:

(a) Over 70% of the total polyphenols and 60% of the total antioxidants of the fruit pomace are also preserved in the extrudates.

(b) One version of 100 g of a product made by this process contains 14 g dietary fiber, 93 mg phenolics, and 652 mg vitamin C equivalent antioxidants.

(c) The extrudates are very light in weight with 0.19-0.27 g/cm$^3$ piece density and expanded well with an expansion ratio of 7.7-8.4, providing improved textural qualities.

(d) The expanded extrudates made in the present invention have unique internal microstructure (uniform air cell distribution, size, and density) compared to those made by steam extrusion.

Example 2

Supercritical $CO_2$ Extrusion of Milk Protein Puffs Fortified with Fruit Pomace and Liquid Cheese Whey Fruit pomace and liquid cheese whey, byproducts generated from food processing industries, were incorporated in high protein extruded products as a source of dietary fiber and bioactive nutrients. Feed formulations containing 70-90% milk protein concentrate (MPC) with 22% fruit pomace were processed by supercritical fluid extrusion (SCFX) at low-temperatures (~90° C.). The process incorporated concentrated liquid cheese-whey containing 20.2 wt. % total solids by directly injecting it into extruder barrel at 27.5 wt. % of the dry-feed flow rate, providing 5.6% whey solids to the feed formulation. The resulting MPC extrudates retained their creamy color and natural fruit pomace color following SCFX processing, indicating that little, if any, Maillard browning occurred during the process even though a significant quantity of soluble sugars was present in both the pomace and liquid whey. The addition of 22% fruit pomace and 5.6% (dry wt.) whey solids did not affect the piece density (0.24-0.31 g/cm$^3$), expansion ratio (4.6-5.7), and hardness (38-78 N) of MPC extrudates, which were comparable to those of starch- or protein-based extrudates made by conventional steam extrusion. Incorporating fruit pomace in extruded products could improve the dietary fiber and bioactive phytochemical contents of the extrudates and the value of the byproducts as a source of nutritional and functional food ingredients.

The objectives of this study were to evaluate the potential of incorporating fruit pomace and concentrated liquid cheese-whey, a byproduct of cheese making, in extrusion applications, particularly in high protein extruded products comprised mainly of milk protein concentrate by using low-temperature SCFX process and determine their impact on end-product extrudate textural qualities.

Materials and Methods

Apple pomace (AP) and grape pomace (GP) were obtained from New York State Agricultural Experiment Station, Geneva, N.Y. The AP and GP were dried at 40° C. for 48 hours, and finely ground with a hammer mill to pass through a screen size opening of 0.031 inches. The apple and grape pomace powders were stored in sealed polyethylene bags at 4° C. until used.

Milk protein concentrate (MPC) was purprovided by Glanbia Nutritionals (Evanston, Ill., USA). Pre-gelatinized (pregel) corn starch and Star-Dri_1, Maltodextrin were obtained from Tate & Lyle Ingredients (Decatur, Ill., USA). Powdered lecithin was provided by ADM-Lecithin (Decatur, Ill., USA). Distilled mono-glyceride was provided by Danisco ingredients (Kansas, Mo.). Acid cheese whey was obtained from the dairy processing pilot plant at Cornell University, Ithaca, N.Y. and concentrated to a ~20% total solid content by using a vacuum evaporator at temperature 70° C. The pH of the concentrated whey was 4.2.

Feed Formulations

Experiment I was conducted to determine how fruit pomace addition impacts the textural quality of protein and starch extrudates. The MPC was pre-hydrated to 18% moisture by spraying water while continuously mixing in a SP130 San Cassiano mixer (Roddi Alba, Piemonte, Italy). In experiment II, the liquid cheese whey was concentrated and directly injected into extruder barrel in lieu of water and as a source of milk nutrients. The concentrated liquid whey containing ~20% solid content was injected at a flow rate of 27.5 wt. % of the dry-feed flow, providing 5.6% dry wt. whey solids to the final feed formulation. The feed formulations and functionalities of each ingredient used in these experiments are shown in Table 10 and Table 11.

TABLE 10

Feed formulations used for fruit pomace extrusion

| Extrudate Formulations | Milk Protein Concentrate-80 (%) | Binder/Starch (%) | Fruit Pomace (%) |
| --- | --- | --- | --- |
| MPC* | 92 | 6% Maltodextrin | No Apple/grape pomace |
| MPC + AP | 70 | 6% Maltodextrin | 22% Apple pomace |
| MPC + GP | 70 | 6% Maltodextrin | 22% Grape pomace |
| Starch | 0 | 98% Pregel Starch | No Apple/grape pomace |
| Starch + AP | 0 | 76% Pregel Starch | 22% Apple pomace |
| Starch + GP | 0 | 76% Pregel Starch | 22% Grape pomace |

MPC: Milk Protein Concentrate-80;
AP: apple pomace,
GP: grape pomace.
All 5 formulations contained 1% distilled monoglycerides and 1% lecithin as emulsifier and anti-sticking agents, respectively.
*MPC was pre-hydrated to 18% moisture by spraying water while continuously mixing in a SP130 San Cassiano mixer (Roddi d'Alba, Piemonte, Italy).

TABLE 11

SCFX process parameters for pomace incorporated milk protein extrudates

| | Process conditions | | |
| --- | --- | --- | --- |
| Process parameters | MPC alone | MPC + AP | MPC + GP |
| Feed rate (kg/h) | 35 | 35 | 35 |
| Extruder motor load (%) | 15 | 13 | 14 |
| Extruder screw speed (rpm) | 180 | 135 | 180 |
| Water/liquid whey flow (% Feed) | 40 | 25 | 22.5 |
| Specific mechanical energy (kJ/kg) | 73.2 | 52.5 | 61.5 |
| Extrudate temperature (° C.) | 92 | 85.3 | 99 |

All other constant parameters:
Barrel temperature = 25° C.;
Die pressure = 10.3 MPa;
SC-CO$_2$ injection pressure = 7.6 MPa;
SC-CO$_2$ injection rate = 7.6 × 10$^{-5}$ kg/s to provide 1% of the feed rate.

Supercritical-CO$_2$ Extrusion

Figure 11:
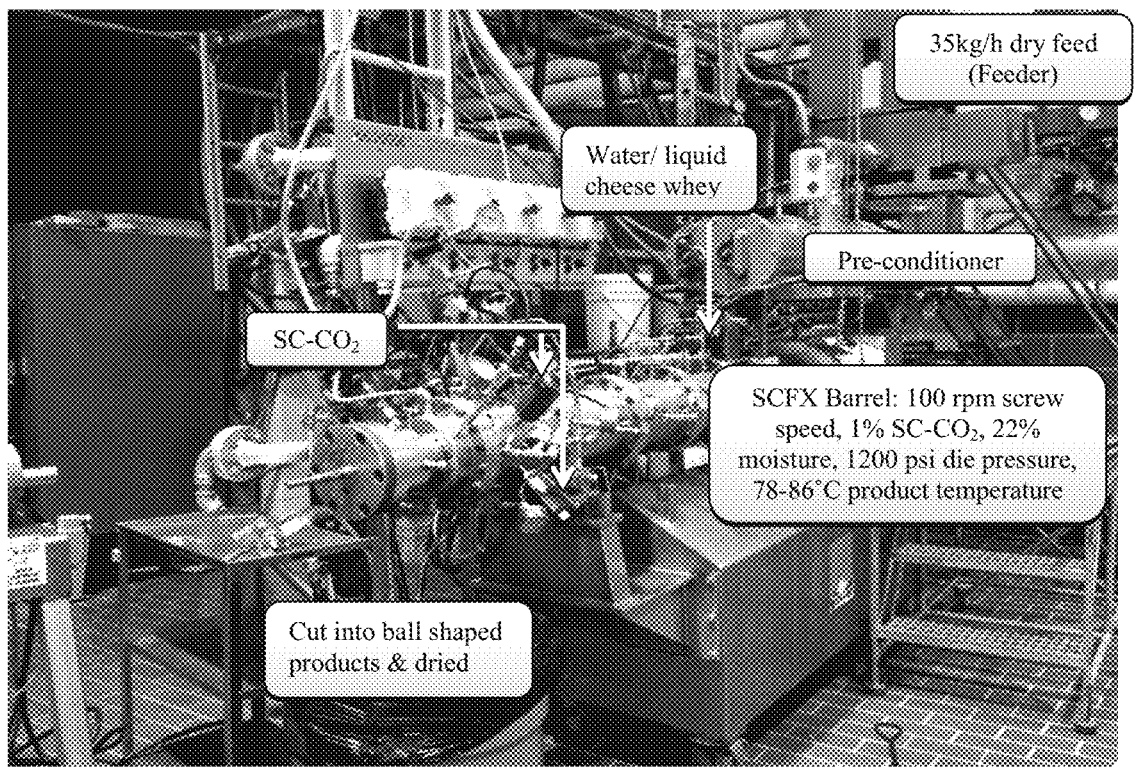
FIG. 11 is a photograph of a pilot-scale Wenger TX-52 Magnum co-rotating twin-screw SCFX system used to produce extruded products containing fruit pomace and liquid cheese whey.

Dry blend formulations were extruded using a pilot scale Wenger TX-52 co-rotating twin-screw extruder with barrel diameter of 52 mm and length/diameter (L/D) ratio of 28.5 configured to operate at a screw speed of 100-180 rpm and the die pressure of 1200 psi (FIG. 11, Wenger Manufacturing, Sabetha, Kans.). The feed rate was set to 35 kg/h for all treatments, with injection of 1% supercritical CO$_2$ of dry feed flow. Water was injected into the extruder at 22-24 wt. % of dry feed flow rate. The final product temperature was around 86-94° C. A circular cross-section die with diameter of 4.13 mm were used to shape the extrudates. The extrudates were cut into ball shaped products using a knife with 2 blades rotating at 900 rpm, collected in trays, and dried in a forced-air oven at 90° C. to ~5-8% moisture content. The products were allowed to cool down to room temperature and stored in sealed bags.

The specific mechanical energy (SME) input into the dough was calculated from the following equation:

$$SME = 37.3 \left( \frac{\% \text{ Extruder load}}{100} \right) \left( \frac{\text{Extruder screw speed}}{306} \right) \left( \frac{3600}{\text{Extruder feed rate}} \right) \quad (1)$$

where extruder screw speed is in rpm (100-180 rpm), 306 rpm is the maximum extruder screw speed, 37.3 kW is the power input and the extruder feed rate is in kg/h (35 kg/h)

Extrudate Characterization

Bulk density was measured by filling a container of known volume with the product, and dividing the weight of extrudates by its volume. Piece density, defined as the ratio of the mass of the sample to that of its volume that includes internal pores but excludes the void or space among the pieces, was measured by using sand displacement method (Webb 2001). Five replicates were measured for each set of samples. Expansion ratio was calculated as the cross-sectional area of the extrudate divided by the cross-sectional area of the die opening (Alavi et al. 1999). An average diameter of 10 samples was measured with a Vernier caliper to determine the expansion ratio of each set of samples.

The color of extrudates was measured with a CR-400 Chroma Meter (Konica Minolta Sensing Inc., Osaka, Japan) using the CIE L*, a*, b* coordinate system. The color meter was calibrated with a standard white plate (Y=93.8, x=0.3131, y=0.3191). Extrudates were ground into fine powder and the color readings were taken with five replicates of each sample. The total color difference (DE) and browning index (BI, purity of brown color) of the premix blends and extruded products were calculated using the following equations:

$$DL^* = L_1^* - L_2^*,\ Da^* = a_1^* - a_2^*,\ \text{and}\ Db^* = b_1^* - b_2^* \quad (2)$$

Where $L_1^*$, $a_1^*$, $b_1^*$ mean color values of the initial blend before extrusion, and $L_2^*$, $a_2^*$, $b_2^*$ represent color values of the final products after extrusion.

$$DE = \sqrt{DL^{*2} + Da^{*2} + Db^{*2}} \quad (3)$$

$$BI = \frac{100(x - 0.31)}{0.17}\ \text{where} \quad (4)$$

$$x = \frac{a_2^* + 1.75\ L_2^*}{5.645\ L_2^* + a_2^* - 3.012\ b_2^*}$$

Textural characteristics of the extrudates were determined by using a TA-XT2 texture analyzer operating with Texture Exponent 32 software (both from Stable Micro Systems Ltd., Godalming, Surrey, U.K.). Fifteen extrudates from each treatment were equilibrated using a humidity chamber (28% RH, 48 h). The extrudates were compressed perpendicular to the direction of extrusion to 50% of their average original diameter, using a 35 mm compression plate at a test speed of 2 mm/s. The peak force (N), initial gradient (N/mm) and the total number of peaks of the force-deformation curve were recorded and analyzed to calculate the hardness, compression modulus, and crispiness of the products, respectively (Stojceska et al. 2008; Bruns and Burne 1975).

Moisture content of samples was determined by drying samples in a forced air oven at 130° C. for 2 hours. Water activity was measured using the AquaLab water activity meter (Decagon Device, Inc., Pullman, Wash., USA). Water hydration capacity ($C_H$) of the ingredients and premix formulations were determined by using the AACC method 56-20 (AACC international, 2009; Karkle et al., 2012). The $C_H$ was defined as grams of water adsorbed per grams of dry matter. A 75 mg sample was weighed into 1.5 mL centrifuge tubes and 1-mL distilled water was added and tubes were vortexed to suspend the contents. The material was allowed to hydrate for 10 min with vortexing in 5 and 10 min. The tubes were centrifuged for 15 min using Eppendorf 5414 Centrifuge (Hamburg, Germany). The supernatant was discarded and the sediment was weighed to estimate the grams of water adsorbed per grams of dry matter.

The internal microstructure of the pomace extrudates were observed by Tescan-Mira FESEM electron microscope. The sample was cut into a thin slice, mounted on aluminum stubs with double-sided adhesive tape, coated with gold-palladium, and examined at an intensity of 5 kV.

Statistical Analysis

Twelve treatments of varying composition of protein and starch-based apple and grape pomace formulations were extruded with water (control) and concentrated liquid cheese whey with two replications. Data were analyzed for analysis of variance by using JMP 10.0.2 statistical software (SAS Institute Inc.). Least significant differences were determined using Tukey-Kramer HSD test at the 5% significance level.

Result and Discussion

Effect of Fruit Pomace Incorporation

Figure 12:
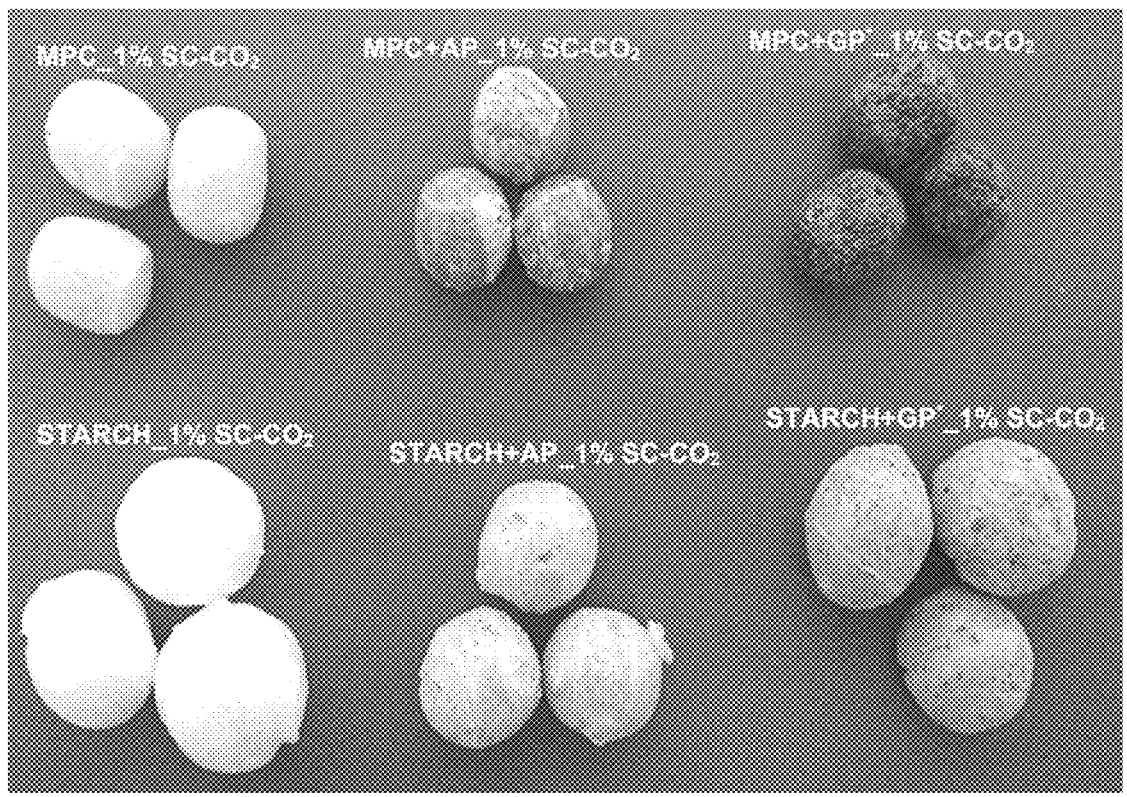
FIG. 12 is a photograph of MPC- and starch-based fruit pomace extrudates made by SCFX. *Due to limited quantity of grape pomace, purple and green grape pomace were used in MPC- and starch-based extrudates, respectively

Photographs of representative MPC and starch-based fruit pomace extrudates are shown in FIG. 12. The MPC extrudates without added pomace retained its creamy color after SCFX process, indicating that little, if any, Maillard browning occurred during the process. Extrudates containing apple and grape pomace retained the distinctive color of their respective fruit. Since the process uses low temperature and low sheer conditions, it did not cause any discoloration to the final products, indicating the retention of protein nutritional qualities of the final extrudates.

Extrudate physical properties including bulk density, piece density, and expansion ratio are summarized in Table 12. The MPC-fruit pomace extrudates showed higher density and lower expansion ratio compared to starch-based pomace extrudates. Allen et al. (2007) reported that high amount of protein inhibits the growth of air cells in extrudates, which results protein extrudate with low expansion and high density. However, the MPC-based extrudates made in this study with supercritical fluid extrusion had piece densities ranging from 0.24 to 0.29 g/cm$^3$, which were lower than those reported for various protein extrudates: whey protein extrudate containing 50-70% whey protein concentrate had piece density of 0.63-0.75 g/cm$^3$ (Paraman et al. 2013) and soy protein extrudates containing 50% soy protein concentrate had density of 0.30-0.45 g/cm$^3$ (Zhu et al. 2010). Extruded food products that have density in the range of 0.02-0.7 g/cm$^3$ are classified as low density products thereby the present MPC-pomace extrudates made by SCFX can be classified as low-density, expanded products.

TABLE 12

Selected physical properties of MPC- and starch-based fruit pomace extrudates [1]

| Treatments | Bulk density (g/cm$^3$) | Piece density (g/cm$^3$) | Expansion ratio | Hardness (N) | Compression modulus (N/mm) | Crispness (No. of peaks) |
|---|---|---|---|---|---|---|
| Protein-based extrudates | | | | | | |
| MPC | 0.21 a | 0.29 a | 5.6 c | 61.6 a | 80.7 ab | 14.0 a |
| MPC + AP | 0.22 a | 0.29 a | 5.4 c | 39.3 b | 94.1 a | 12.5 b |
| MPC + GP | 0.22 a | 0.24 b | 5.7 c | 38.6 c | 54.3 bc | 15.1 a |
| Starch-based extrudates | | | | | | |
| Starch | 0.14 c | 0.21 b | 10.7 a | 22.1 c | 9.4 d | 18.3 a |
| Starch + AP | 0.18 b | 0.23 b | 8.2 b | 22.2 c | 26.3 c | 17.5 a |
| Starch + GP | 0.13 c | 0.18 c | 10.6 a | 19.1 d | 16.2 c | 16.7 a |

[1] Means in the same column followed by different letters are significantly different (P < 0.05).
MPC: milk protein concentrate; AP: apple pomace; GP: grape pomace.

When added up to the 22% level, the apple or grape pomace did not affect the expansion or density of the final MPC extrudates. However, when the same level of the fruit pomace were added to starch-based formulations, the expansion ratio decreased from 10.7 to 8.2, piece density increased from 0.21 to 0.24 g/cm$^3$, and bulk density increased from 0.14 to 0.18 g/cm$^3$. Previous studies also indicated that the addition of pomace decreased the expansion of extrudate and thus increased the density of the final products due to the high content of insoluble fiber of pomace, which reduces viscoelasticity and gas holding capacity of the extrudate melt (Lue, et al. 1990). As previously reported by other researchers, the starch-based pomace extrudates showed an inverse relationship between density and expansion (Koksel et al. 2003; Karkle et al. 2012).

Hardness, brittleness, and crispiness of the pomace extrudates are summarized in Table 12. Compared to starch-based extrudates, the MPC-pomace extrudates showed higher hardness and brittleness. As expected, the hardness values inversely correlated with the expansion ratio of extrudates. According to Maskan and Altan (2011), the extrudates that had a lower expansion had thicker cell wall and thus higher hardness. The addition of fruit pomace decreased the hardness of MPC extrudates, which was probably caused by the insoluble fiber of the pomace, however, the pomace addition did not affect the hardness of the starch-based extrudates. Overall the hardness values of MPC-based extrudates (39-62 N) and starch-based extrudates (19-22 N) made by the present SCFX process were comparable to those reported for corn flour-based apple pomace extrudates made by conventional steam extrusion (20-70 N) (Karkle et al. 2012). Similarly, the crispiness measured by number of peaks of force deformation curve indicated that crispiness of the pomace incorporated extrudates were comparable to that of their respective starch-alone or protein-alone control extrudates.

The pomace addition did not much affect the hardness or crispiness, which contradicted to the typical inverse relationship between expansion ratio and hardness reported in the literature. The pomace incorporated extrudates might be more brittle as compared to those of starch or MPC alone extrudates due to high content of fiber derived from pomace. Besides, as indicated in Table 11, the optimal feed moisture requirement decreased from 35% to 22.5 when pomace was incorporated in starch or protein-alone formulations, which was due to the high hydration capacity of pre-gelatinized starch (13.6 g water/g starch) and MPC (7.3 g water/g MPC) as compared to pomace incorporated formulations (3.0-4.8 g water/g formulation) (data not listed in Table). Compared to starch or MPC-alone control formulation, pomace incorporated formulations required less water requirement (22-25% of the feed flow rate) during the processing. Because of its high fiber content, the fruit pomace incorporation significantly decreased the water hydration capacity of the formulations (3.0-4.8 g water/g formulation). The decreased in the in-barrel moisture might have compensated the increased hardness caused by pomace addition.

Effect of Liquid Cheese-Whey Incorporation

Figure 13:
FIG. 13 is a photograph of pomace and liquid whey incorporated MPC extrudates made by SCFX. Liquid whey was concentrated acid whey with ~20 wt. % total solids and pH of 4.2.

Liquid cheese whey, a by-product of cheese manufacturing, was added to extrudate as a source of milk nutrients. The liquid whey was concentrated to 20.2% total solid content and directly injected into the extruder barrel at 27.5 wt. % of dry-feed flow rate. Photographs of the MPC extrudates fortified with fruit pomace and liquid whey are shown in FIG. 13. As seen in the photograph of the protein puffs, there were no undesirable color change caused by liquid whey addition, indicating that no any undesirable interaction between protein and soluble sugars occurred during the process, even though a significant quantity of soluble sugars were present in both pomace and liquid whey.

No significant differences were observed in water activity of the pomace extrudates extruded with water or whey although the extrudates made with whey contained higher moisture contents than those made with water, which was due to the high hygroscopic nature of lactose presence in whey (Table 13). Whey solids are known to bind water and increase the moisture retention of the final extrudates (Onwulata et al. 1998). All the pomace extrudates had low water activity (0.49-0.54) and thus they are shelf-stable products. According to Grant (2004), a water activity of 0.61 is the lowest value for microbial growth.

Selected physical properties of liquid cheese whey added extrudates are shown in Table 13. The piece density and expansion ratio of pomace extrudates extruded with water or whey did not differ significantly. Previous studies indicated that with the addition of whey protein and lactose, the expansion ratio of extrudate is generally reduced (Onwulata et al. 1998 & 2001). However, no such differences were observed in expansion ratio and piece density of the extrudates made with water and liquid whey in this study, which probably be due to the fact that liquid whey provided only 5.6% (dry wt.) whey solids. The hardness values of the liquid whey-added products were higher than those of the control water-added products, which might be due to the protein and lactose presence in liquid whey. As indicated by the compression modulus values, the MPC-pomace extrudates made with liquid whey had lower brittleness than the extrudates made with water. The crispiness of both water and whey added extrudates were not significantly different. Overall, the liquid cheese whey addition did not affect the textural qualities of the apple or grape pomace extrudates.

TABLE 13

Textural properties of MPC-fruit pomace extrudates made with water and liquid whey[1]

| Physical characteristics | Extruded with water (control) | | | Extruded with liquid whey | | |
| --- | --- | --- | --- | --- | --- | --- |
| | MPC | MPC + AP | MPC + GP | MPC | MPC + AP | MPC + GP |
| Moisture content (%) | 9.3 b | 8.1 b | 7.2 b | 11.5 a | 8.8 ab | 8.1 ab |
| Water activity ($a_w$) | 0.52 a | 0.54 a | 0.50 a | 0.53 a | 0.52 a | 0.51 a |
| Bulk density (g/cm$^3$) | 0.21 a | 0.22 a | 0.22 a | 0.24 a | 0.24 a | 0.20 a |
| Piece density (g/cm$^3$) | 0.29 a | 0.29 a | 0.24 b | 0.30 a | 0.31 a | 0.24 b |
| Expansion ratio | 5.6 b | 5.4 ab | 5.7 a | 5.7 ab | 4.6 b | 5.6 ab |
| Hardness (N) | 61.6 a | 39.3 b | 38.6 b | 63.7 ab | 77.8 a | 52.4 bc |

TABLE 13-continued

Textural properties of MPC-fruit pomace extrudates made with water and liquid whey[1]

| Physical characteristics | Extruded with water (control) | | | Extruded with liquid whey | | |
|---|---|---|---|---|---|---|
| | MPC | MPC + AP | MPC + GP | MPC | MPC + AP | MPC + GP |
| Compression modulus (N/mm) | 80.7 b | 94.1 a | 54.3 bc | 90.0 ab | 42.8 cd | 37.8 d |
| Crispness (No. of peaks) | 14.0 abc | 12.5 c | 15.1 abc | 12.8 bc | 16.4 ab | 16.9 a |

[1]Means in the same column followed by different letters are significantly different ($P < 0.05$).
MPC: milk protein concentrate; AP: apple pomace; GP: grape pomace.

Figure 14:
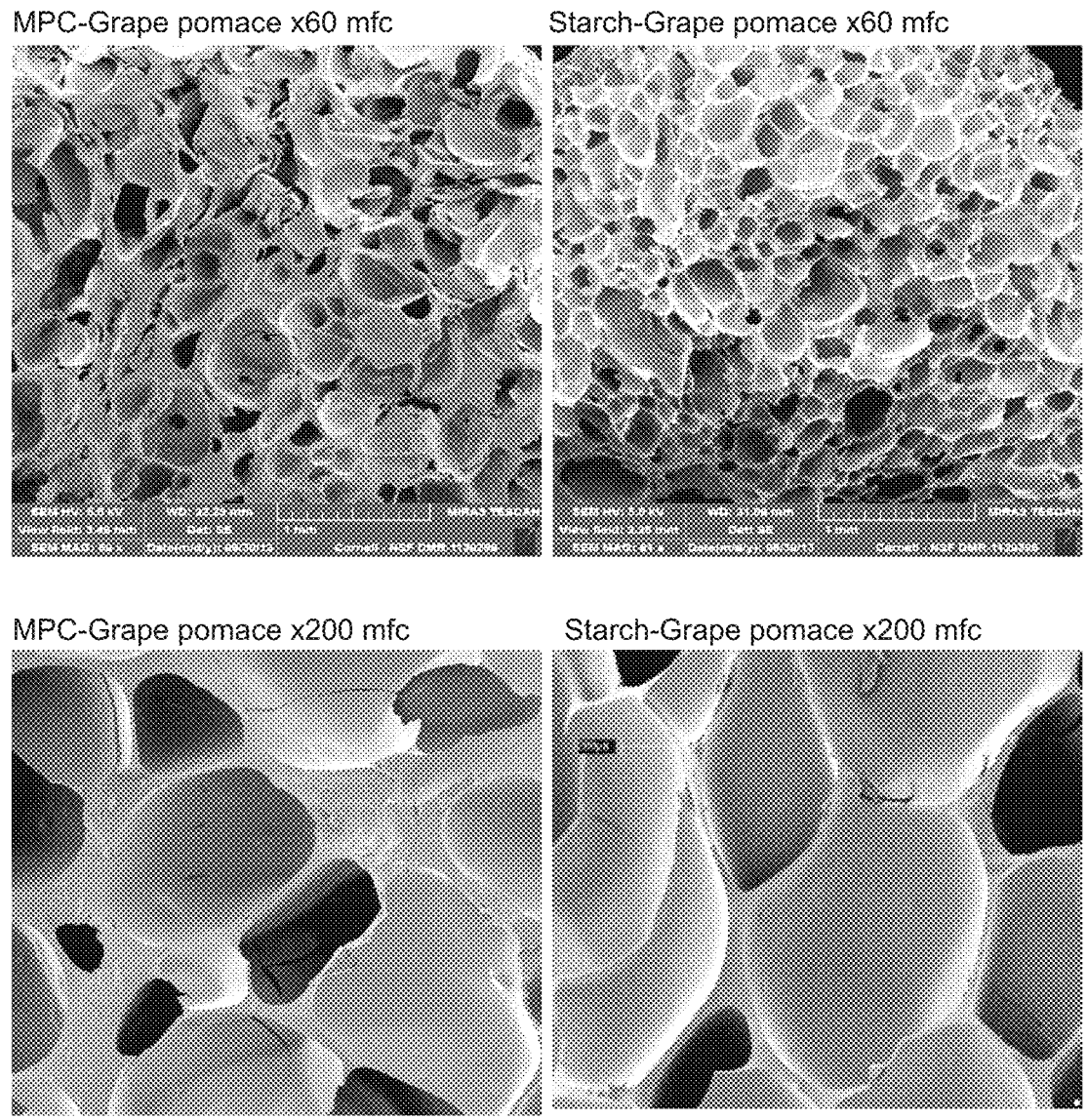
FIG. 14 are scanning electron micrographs of grape-pomace and cheese-whey incorporated puffed MPC and starch-based extrudates made by SCFX with 1% SC-$CO_2$.

SEM pictures confirmed that MPC extrudates had air cell with thicker cell wall (13.7±3.1 μm) compared to starch extrudates (6.8±1.5 μm) (FIG. 14). This explains the textural quality differences observed between MPC and starch based pomace extrudates. However, the both pomace extrudates of MPC and starch made by SCFX process contained unique uniform internal morphology with closed cell structure. Furthermore, no significant differences were observed with the internal morphology due to whey or water added extrudates (micrograph not shown).

As seen in Table 14, addition of fruit pomace increased the natural color of the extrudates. The liquid whey addition did not affect the color of the final products, even though a significant quantity of soluble sugars was present in both pomace and liquid whey. Apple pomace contains phenolic compound, phloridzin, which produces yellow compounds due to oxidation so that b* value after extrusion was distinctly increased from 14.6 to 26 compared to the initial blend (Bhushan et al. 2008). As reported by Maskan and Altan (2011) pomace incorporation reduced the lightness (L* value) and increased the redness (a* value) of the extrudates, mostly due to the natural color of the original pomace. The browning index (BI) indicates the purity of brown color which is an index of enzymatic and non-enzymatic reactions (Palou et al. 1999). The BI value was not significantly changed by liquid whey addition to all six formulations. However, addition of apple pomace showed larger change in BI values of the final extrudates whereas the grape pomace extrudates showed comparatively smaller change in BI values before and after extrusion, indicating the influence of the natural color of pomace rather than the color change due to browning reactions.

Conclusions

Fruit pomace and liquid whey were incorporated into protein and starch based ready-to-eat extruded products by using a low-temperature (~90° C., melt temperature), low-shear (100-180 rpm) supercritical fluid extrusion process. The addition of pomace (22% wt.) and liquid whey containing whey solids of 5.6% wt. did not affect the overall textural quality of the final extrudates. The protein (MPC-based) extrudates had piece density of 0.24-0.31 g/cm$^3$, which was within the range of protein extrudates made by conventional steam extrusion (0.02-0.7 g/cm$^3$). Hardness of the pomace and liquid whey incorporated MPC extrudates ranged from 38-78 N, which was higher than those of starch-based pomace extrudates (22-38 N). However, the hardness values of the MPC-pomace extrudates were comparable to those of the protein extrudates (20-70 N) made by steam extrusion. The fruit pomace addition can improve the dietary fiber contents of the protein extrudates without compromising their end-product textural qualities.

REFERENCES

Citation of a reference herein shall not be construed as an admission that such reference is prior art to the present invention. All references cited herein are hereby incorporated by reference in their entirety. Below is a listing of various references cited herein:

AACC International, 2000. Approved Methods of the American Association of Cereal Chemists, 10th Ed. Methods 44-31. The Association: St. Paul, Minn.

TABLE 14

Color analysis of MPC-pomace extrudates made with water and liquid whey[1]

| Treatments | Dry blend premix | | | | Extrudates | | | | Color change (DE) |
|---|---|---|---|---|---|---|---|---|---|
| | $L_0$ | $a_0$ | $b_0$ | $BI_0$ | $L_E$ | $a_E$ | $b_E$ | $BI_E$ | |
| Extruded with water (control) | | | | | | | | | |
| MPC | 98.2a | −1.72c | 11.2b | 10.5b | 87.4b | −1.32d | 25.1a | 32.0b | 17.6d |
| MPC + AP | 89.5b | 1.62b | 14.5a | 18.6a | 73.0c | 7.34a | 26.5a | 51.6a | 21.1b |
| MPC + GP | 80.8c | 1.98a | 6.44c | 9.9c | 55.6d | 4.99c | 6.6c | 18.8d | 25.3a |
| Extruded with liquid whey | | | | | | | | | |
| MPC | 98.2a | −1.72c | 11.2b | 10.5b | 90.9a | −1.98e | 21.3b | 24.5c | 12.5e |
| MPC + AP | 89.5b | 1.62b | 14.5a | 18.6a | 74.5c | 6.29b | 26.0a | 48.4a | 19.5c |
| MPC + GP | 80.8c | 1.98a | 6.44c | 9.9c | 56.3d | 4.65c | 4.8c | 14.7d | 24.7a |

[1]Means in the same column followed by different letters are significantly different ($P < 0.05$).
MPC: milk protein concentrate; AP: apple pomace; GP: grape pomace; DE: total color difference of samples before and after extrusion; BI: browning index.

Alavi, S. H., Gogoi, B. K., Khan, M., Bowman, B. J. & Rizvi, S. S. H. (1999). Structural properties of protein-stabilized starch-based supercritical fluid extrudates. *Food Research International*, 32, 107-118.

Alavi, S., & Rizvi, S. S. H. Supercritical fluid extrusion—a novel method for producing microcellular structures in starch-based matrices. In *Novel Food Processing—Effects on Rheological and Functional Properties*, Eds. Ahmed, J., Ramaswamy, H. S., Kasapis, S., and Boye, J. Taylor and Francis. 2009. pp Alavi, S., Karkle, E., Adhikari, K., & Keller, L. (2011). Extrusion research for addressing the obesity challenge. *Cereal foods world*, 56(2), 56-60.

Allen, K. E., Carpenter, C. E., & Walsh, M. K. (2007). Influence of protein level and starch type on an extrusion-expanded whey product. *International Journal of Food Science and Technology*, 42, 953-960.

Altan, A., McCarthy, K. L., & Maskan, M. (2008a). Evaluation of snack foods from barley-tomato pomace blends by extrusion processing. *Journal of Food Engineering*, 84(2), 231-242.

Altan, A., McCarthy, K. L., & Maskan, M. (2008b). Twin-screw extrusion of barley-grape pomace blends: Extrudate characteristics and determination of optimum processing conditions. *Journal of Food Engineering*, 89(1), 24-32.

Arêas, J. A. (1992). Extrusion of Food proteins. *Critical reviews in food science and nutrition*, 32(4), 365-92.

Balasundram, N., Sundram, K., & Samman, S. (2006). Phenolic compounds in plants and agri-industrial by-products: Antioxidant activity, occurrence, and potential uses. *Food Chemistry*, 99(1), 191-203.

Bhushan, S., Kalia, K., Sharma, M., Singh, B., & Ahuja, P. S. (2008). Processing of apple pomace for bioactive molecules. *Critical reviews in biotechnology*, 28(4), 285-96.

Bibbins-Martíneza, M. D., Enciso-Chávez, B., Galiciaa, S. B. N., & Hernández. D. C. Soluble Dietary Fiber generation from Apple Pomace http://www.icefll.org/content/papers/few/FEW1013.pdf Brennan, M. A., Derbyshire, E., Tiwari, B. K., & Brennan, C. S. (2013). Ready-to-eat snack products: the role of extrusion technology in developing consumer acceptable and nutritious snacks. *International Journal of Food Science & Technology*.

Brunner, G. (2005). Supercritical fluids: technology and application to food processing. *Journal of food engineering*, 67(1-2), 21-33.

Bruns, J. A., & Bourne, M. C. (1975). Effects of sample dimensions on the snapping force of crisps foods. *Journal of Texture Studies*, 6, 445-458.

Cho, K. Y. & Rizvi, S. S. H. (2010). New generation of healthy snack food by supercritical fluid extrusion. *Journal of Food Processing and Preservation*, 34, 192-218.

Deng, Q., Penner, M. H., & Zhao, Y. (2011). Chemical composition of dietary fiber and polyphenols of five different varieties of wine grape pomace skins. *Food Research International*, 44 (9) (2011), pp. 2711-2719.

Gassara, Fatma, Brar, S. K., Pelletier, F., Verma, M., Godbout, S., & Tyagi, R. D. (2011). Pomace waste management scenarios in Québec—Impact on greenhouse gas emissions. *Journal of Hazardous Materials*, 192(3), 1178-1185.

Grant, W. D. (2004). Life at low water activity. *Philosophical Transactions of the Royal Society B: Biological Sciences*, 359(1448), 1249-1267.

Harper, J. M. (1981). Extrusion of Foods, Vol. 1. Pp. 21-45. Boca Raton: CRC press, Inc.

Hwang, J. K., Choi, J. S., Kim, C. J., & Kim, C. T. (1998). Solubilization of Apple Pomace by Extrusion. *Journal of Food Processing and Preservation*, 22(6), 477-491.

Karkle, E. L., Alavi, S., & Dogan, H. (2012). Cellular architecture and its relationship with mechanical properties in expanded extrudates containing apple pomace. *Food research international*, 46(1), 10-21.

Khanal R C, Howard L R, Brownmiller C, Prior R L (2009a) Influence of extrusion processing on procyanidin composition and total anthocyanin contents of blueberry pomace. *Journal of Food Science* 74:52-58.

Khanal, R. C., Howard, L. R., & Prior, R. L. (2009b). Procyanidin Content of Grape Seed and Pomace, and Total Anthocyanin Content of Grape Pomace as Affected by Extrusion Processing. *Journal of Food Science*, 74(6), H174-H182.

Köksel, H., Ryu, G. H., Özboy-Özbas, Ö, Basman, A. & Ng, P. K. W. (2003). Development of a bulgur-like product using extrusion cooking. Journal of the science of food and agriculture, 83, 630-636.

Lue, S., Hsieh, F., Peng, I. C. & Huff, H. E. (1990). Expansion of corn extrudates containing dietary fiber: A microstructure study. *Lebens-Wiss Technol*, 23, 165-173.

Madrera, R. R., Bedriñana, R. P., Hevia, A. G., Arce, M. B., & Valles, B. S. (2013). Production of spirits from dry apple pomace and selected yeasts. *Food and Bioproducts Processing*.

Mahawar, M., Singh, A., & Jalgaonkar, K. (2012). Utility of apple pomace as a substrate for various products: A review. *Food and Bioproducts Processing*, 90 (4), 597-605.

Maskan M., & Altan A. (2011). Advances in Food Extrusion Technology. CRC Press 2011. 121-168.

Masoodi, F. A., Sharma, B., & Chauhan, G. S. (2002). Use of apple pomace as a source of dietary fiber in cakes. *Plant Foods for Human Nutrition*, 57(2), 121-128.

Min, S., Evrendilek, G. A., & Zhang, H. Q. (2007). Pulsed electric fields: processing system, microbial and enzyme inhibition, and shelf life extension of foods. *IEEE Transactions on Plasma Science*, 35(1), 59-73.

Onwulata, C. I., & Heymann, H. (1994). Sensory properties of extruded corn meal related to the spatial distribution of process conditions. *Journal of sensory studies*, 9(1), 101-112.

Onwulata, C. I., Konstance, R. P., Smith P. W., & Holsinger, V. H. (1998). Physical properties of extruded products as affected by cheese whey. *Journal of food science: an official publication of the Institute of Food Technologists*, 63(5), 814.

Onwulata, C. I., Smith, P. W., Konstance, R. P., & Holsinger, V. H. (2001). Incorporation of whey products in extruded corn, potato or rice snacks. *Food Research International*, 34(8), 679-687.

Palou, E., López-Malo, A., Barbosa-Cánovas, G. V., Welti-Chanes, J., & Swanson, B. G. (1999). Polyphenoloxidase activity and color of blanched and high hydrostatic pressure treated banana puree. *Journal of Food Science*, 64(1), 42-45.

Paraman, I., Supriyadi, S., Wagner, M. E., & Rizvi, S. S. (2013). Prebiotic fiber-incorporated whey protein crisps processed by supercritical fluid extrusion. *International Journal of Food Science & Technology*. DOI: 10.1111/ijfs. 12204.

Paraman, I., Wagner, M. E., & Rizvi, S. H. (2012). Micronutrient and protein fortified whole grain puffed rice made by supercritical fluid extrusion. *Journal of Agricultural and Food Chemistry* 60: 11188-11194.

Rizvi, S. S. H.; Mulvaney, S. J. Extrusion Processing with Supercritical Fluids. U.S. Pat. No. 5,120,559. 1992.

Rizvi, S. S. H.; Mulvaney, S. J.; Sokhey, A. S. The combined application of supercritical fluid and extrusion technology. *Trends Food Sci. and Technol.* 1995, 6, 232-240

Robinson, T. Chandran, B. Nigam, P. Removal of dyes from a synthetic textile dye effluent by biosorption on apple pomace and wheat straw. Water Research, 36 (2002), pp. 2824-2830

Schieber, Andreas, et al., "A new process for the combined recovery of pectin and phenolic compounds from apple pomace." *Innovative Food Science & Emerging Technologies* 4.1 (2003): 99-107.

Stojceska V., Ainsworth P., Plunkett A., Ibanoglu E., & Ibanoglu S. (2008). Cauliflower by-products as a new source of dietary fibre, antioxidants and proteins in cereal based ready-to-eat expanded snacks. *Journal of Food Engineering,* 87 (4), 554-563.

Vendruscolo, F., Albuquerque, P. M., Streit, F., Esposito, E., & Ninow, J. L. (2008). Apple pomace: A versatile substrate for biotechnological applications. *Critical Reviews in Biotechnology,* 28(1), 1-12.

Walsh, M. K., & Wood, A. M. (2010). Properties of Extrusion-Expanded Whey Protein Products Containing Fiber. *International Journal of Food Properties,* 13 (4), 702-712.

Wang, H. J. Thomas R. L. (1989). Direct Use of Apple Pomace in Bakery Products. *Journal of Food Science,* 54 (1989), pp. 618-620 3

Webb, P. 2001. Volume and density determinations for particle technologists. Micromeritics Instrument Corp. Available from: www.micromeritics.com.

White B L, Howard L R, Prior R L (2010) Release of bound procyanidins from cranberry pomace by alkaline hydrolysis. *Journal of Agricultural and Food Chemistry,* 58:7572-7579

Yu, J., & Ahmedna, M. (2013). Functional components of grape pomace: Their composition, biological properties and potential applications. *International Journal of Food Science and Technology,* 48(2), 221-237.

Zhang, J., & Han, B. (2013). Supercritical or compressed $CO_2$ as a stimulus for tuning surfactant aggregations. *Accounts of chemical research,* 46(2), 425-33.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A process for preparing an edible foodstuff from food industry waste stream byproducts, said process comprising the steps of:
   combining, in an extruder, an extrusion formulation comprising a first food byproduct and at least one additional ingredient, wherein said first food byproduct is liquid whey, and wherein said at least one additional ingredient is a second food byproduct selected from the group consisting of fruit pomace, vegetable pomace, and a combination of fruit and vegetable pomace, wherein the extrusion formulation comprises between about 2 to about 20 percent by dry weight of the liquid whey and between about 10 and about 40 percent by dry weight of the fruit pomace, vegetable pomace, or the combination of fruit and vegetable pomace
   introducing supercritical carbon dioxide ($SC-CO_2$) into the extruder to mix with the first food byproduct and the at least one additional ingredient; and
   producing an edible foodstuff containing the first food byproduct and the at least one additional ingredient, wherein the edible foodstuff comprises an extrudate prepared under supercritical fluid extrusion (SCFX) conditions,
   wherein the process does not require a separate hydration step to yield the extrudate, and
   wherein the liquid whey is used in lieu of water.

2. The process according to claim 1, wherein the liquid whey is selected from the group consisting of liquid cheese whey, liquid yogurt whey, and sweet whey.

3. The process according to claim 1, wherein the liquid whey is concentrated to between about 10 and about 40 percent by dry weight prior to the combining step.

4. The process according to claim 1, wherein the fruit pomace is from a fruit selected from the group consisting of apples, grapes, pears, plums, bananas, peaches, apricots, oranges, mangoes, papayas, melons, berries, tomatoes, nectarines, figs, dates, grapefruits, clementines, pineapple, and ugli fruit, or any other fruit with skin and seeds.

5. The process according to claim 1, wherein the vegetable pomace is from a vegetable selected from the group consisting of carrots, peppers, beets, broccoli, cucumber, squash, corn, potatoes, sweet potatoes, peas, beans, pumpkins, zucchinis, turnips, rutabagas, and parsnips, or any other root crop.

6. The process according to claim 1, wherein the first food byproduct is liquid whey and the second food byproduct is fruit pomace or vegetable pomace.

7. The process according to claim 1, wherein the extrusion formulation further comprises one or more of starch, flour, protein concentrate, functional additives, or flavoring ingredients.

8. The process according to claim 7, wherein the protein concentrate is selected from the group consisting of milk protein concentrate (MPC) and whey protein concentrate (WPC).

9. The process according to claim 1, wherein the at least one additional ingredient further comprises milk protein concentrate (MPC).

10. The process according to claim 1, wherein the at least one additional ingredient further comprises both milk protein concentrate (MPC) and fruit pomace or vegetable pomace.

11. The process according to claim 1, wherein the extrusion formulation is maintained at a temperature of not greater than 100° Celsius during the process.

12. The process according to claim 1, wherein the $SC-CO_2$ is introduced at a constant flow rate.

13. The process according to claim 1, wherein the $SC-CO_2$ is introduced under a high pressure of between about 7.6-10.3 MPa.

* * * * *